US012437604B2

(12) United States Patent
Harpur et al.

(10) Patent No.: US 12,437,604 B2
(45) Date of Patent: Oct. 7, 2025

(54) RANDOMIZED SYMBOL REPLACEMENT WITH SYNCHRONIZATION

(71) Applicant: Games Global Operations Limited, Douglas (IM)

(72) Inventors: Rory Angus Harpur, Durban North (ZA); Marcus Douglas Thorpe-Fairall, Kloof (ZA)

(73) Assignee: Games Global Operations Limited, Douglas (IM)

( * ) Notice: Subject to any disclaimer, the term of this patent is extended or adjusted under 35 U.S.C. 154(b) by 409 days.

(21) Appl. No.: 17/978,544

(22) Filed: Nov. 1, 2022

(65) Prior Publication Data

US 2023/0162559 A1 May 25, 2023

(30) Foreign Application Priority Data

Nov. 25, 2021 (GB) .................................... 2117025

(51) Int. Cl.
*G07F 17/32* (2006.01)
*G06F 7/58* (2006.01)

(52) U.S. Cl.
CPC .......... *G07F 17/3213* (2013.01); *G06F 7/588* (2013.01); *G07F 17/3209* (2013.01); *G07F 17/3265* (2013.01)

(58) Field of Classification Search
CPC ............................ G07F 17/3267; G07F 17/64
See application file for complete search history.

(56) References Cited

U.S. PATENT DOCUMENTS 4,695,053 A * 9/1987 Vazquez, Jr. ........... G07F 17/34 273/143 R
7,052,395 B2 * 5/2006 Glavich .............. G07F 17/3267 463/20

(Continued)

FOREIGN PATENT DOCUMENTS

WO WO-9731344 A1 * 8/1997 ............ G07F 17/34

OTHER PUBLICATIONS

UKIPO, Search Report for UK Patent App. No. GB2117025.3, mailed May 18, 2022, pp. 1-11.

*Primary Examiner* — Steven J Hylinski
(74) *Attorney, Agent, or Firm* — MCDONNELL BOEHNEN HULBERT & BERGHOFF LLP

(57) ABSTRACT

An embodiment may involve receiving, at a receiving component, an instruction; determining, by way of a random number generator (RNG), a set of symbols and a sync symbol; displaying, on a display component, the set of symbols in a two-dimensional array and the sync symbol in a preview space; and while there are pre-determined patterns of symbols in the two-dimensional array: replacing the pre-determined patterns of symbols in the two-dimensional array with vacant symbol positions; determining, by way of random selection by the RNG, whether replacement symbols to be placed in the vacant symbol positions are subject to synchronization, wherein the replacement symbols being subject to synchronization causes each of the vacant symbol positions to be filled with the sync symbol, and wherein the replacement symbols not being subject to synchronization causes each of the vacant symbol positions to be filled with further symbols determined by way of the RNG.

16 Claims, 27 Drawing Sheets

(56) References Cited

U.S. PATENT DOCUMENTS

| | | | | |
|---|---|---|---|---|
| 7,887,407 | B1 * | 2/2011 | Singer ................. | G07F 17/3288 463/19 |
| 9,934,646 | B2 | 4/2018 | Igesund | |
| 9,959,703 | B2 | 5/2018 | Igesund | |
| 9,997,012 | B2 | 6/2018 | Wortmann | |
| 10,068,432 | B2 | 9/2018 | Wortmann | |
| 10,163,305 | B2 | 12/2018 | Wortmann | |
| 10,395,480 | B2 | 8/2019 | Wortmann | |
| 10,522,005 | B2 | 12/2019 | Wortmann | |
| 10,636,242 | B2 | 4/2020 | Wortmann | |
| 10,685,530 | B2 | 6/2020 | Wortmann | |
| 2002/0183105 | A1 | 12/2002 | Cannon | |
| 2003/0100361 | A1 | 5/2003 | Sharpless | |
| 2003/0157981 | A1 * | 8/2003 | Marks ................. | G07F 17/3265 463/20 |
| 2004/0176167 | A1 | 9/2004 | Michaelson | |
| 2010/0004050 | A1 * | 1/2010 | Caputo ............... | G07F 17/3265 463/20 |
| 2017/0213416 | A1 | 7/2017 | Wortmann | |
| 2018/0122184 | A1 | 5/2018 | Wortmann | |
| 2018/0122189 | A1 | 5/2018 | Wortmann | |
| 2018/0211478 | A1 * | 7/2018 | Elias ....................... | G07F 17/34 |

* cited by examiner

RANDOMIZED SYMBOL REPLACEMENT WITH SYNCHRONIZATION

CROSS-REFERENCE TO RELATED APPLICATION

This application claims priority to U.K. patent application no. 2117025.3, filed Nov. 25, 2021, which is hereby incorporated by reference in its entirety.

BACKGROUND

Mechanical symbol display machines typically arrange symbols on one or more horizontally aligned or vertically aligned circular strips and rotate (spin) these strips to display a set of symbols, where one or more symbols are displayed per strip. Various arrangements of displayed symbols may trigger further activity by a mechanical symbol display machine, such as additional rotational movements of one or more of the circular strips. But due to the fixed nature of symbol arrangements on the circular strips, certain output patterns of symbols cannot be displayed. Further, a symbol displayed on a particular strip cannot be replaced with a symbol not already on that strip.

SUMMARY

The embodiments herein involve electronic symbol display machines that follow program instructions (or digital logic in circuitry) to dynamically replace displayed symbols. These electronic symbol display machines may be considered to simulate the operations of mechanical symbol display machines, but without being limited by fixed arrangements of symbols. For example, strips may be of any particular size (in terms of the number of symbols on the strip), and symbols may be added to or removed from a strip as needed. In some embodiments, the concept of a strip itself may not be necessary, as one or more of the symbols displayed may be selected randomly or semi-randomly by way of a random number generator (RNG). Further, symbols that are displayed may be removed or replaced (e.g., by way of graphical animation).

In some embodiments, this may involve selecting (using the RNG) a set of symbols to display. If the displayed symbols include a pre-determined pattern of symbols, this may cause the carrying out of additional operations such as replacement of the pre-determined pattern of symbols. It may be determined (again, using the RNG) whether all of the symbols in the pre-determined pattern of symbols are to be replaced by the same symbol (i.e., synchronized). If this is the case, the synchronized replacement symbol is selected (again using the RNG), and the display is updated to show the replacement symbol instead of the pre-determined patterns of symbols.

In other embodiments, a synchronized replacement symbol may be selected (again, using the RNG) prior to determining whether the pre-determined pattern of symbols is to be replaced by the synchronized replacement symbol (again, using the RNG). In this case, the synchronized replacement symbol may be displayed (e.g., in a preview location separate from display of the strips) before the user finds out whether the pre-determined pattern of symbols is to be replaced by the synchronized replacement symbol, or even before the user finds out if a pre-determined pattern of symbols has been selected.

Accordingly, a first example embodiment may involve receiving, at a receiving component of an electronic symbol display machine, an instruction. The first example embodiment may further involve determining, by way of random selection by an RNG, a set of symbols and a sync symbol. The first example embodiment may further involve displaying, on a display component of the electronic symbol display machine, the set of symbols in a two-dimensional array and the sync symbol in a preview space. The first example embodiment may further involve, while there are one or more pre-determined patterns of symbols in the two-dimensional array: replacing the one or more pre-determined patterns of symbols in the two-dimensional array with vacant symbol positions; determining, by way of random selection by the RNG, whether replacement symbols to be placed in the vacant symbol positions are subject to synchronization, wherein the replacement symbols being subject to synchronization causes each of the vacant symbol positions to be filled with the sync symbol, and wherein the replacement symbols not being subject to synchronization causes each of the vacant symbol positions to be filled with further symbols determined by way of random selection by the RNG.

A second example embodiment may involve receiving, at a receiving component of an electronic symbol display machine, an instruction. The second example embodiment may further involve determining, by way of random selection by a RNG, a set of symbols. The second example embodiment may further involve displaying, on a display component of the electronic symbol display machine, the set of symbols in a two-dimensional array. The second example embodiment may further involve, while there are one or more pre-determined patterns of symbols in the two-dimensional array: replacing the one or more pre-determined patterns of symbols in the two-dimensional array with vacant symbol positions; determining, by way of random selection by the RNG, whether replacement symbols to be placed in the vacant symbol positions are subject to synchronization, wherein the replacement symbols being subject to synchronization causes each of the vacant symbol positions to be filled with a sync symbol determined by way of random selection by the RNG, and wherein the replacement symbols not being subject to synchronization causes each of the vacant symbol positions to be filled with further symbols determined by way of random selection by the RNG.

In a third example embodiment, an article of manufacture may include a non-transitory computer-readable medium, having stored thereon program instructions that, upon execution by a computing system, cause the computing system to perform operations in accordance with the first and/or second example embodiment.

In a fourth example embodiment, a computing system may include at least one processor, as well as memory and program instructions. The program instructions may be stored in the memory, and upon execution by the at least one processor, cause the computing system to perform operations in accordance with the first and/or second example embodiment.

In a fifth example embodiment, a system may include various means for carrying out each of the operations of the first and/or second example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

The use of ordinal numbers such as "first," "second," "third," and so on is to distinguish respective elements rather than to denote a particular order of those elements. For purposes of this description, the terms "multiple" and "a plurality of" refer to "two or more" or "more than one."

I. Example Architecture

Figure 1:
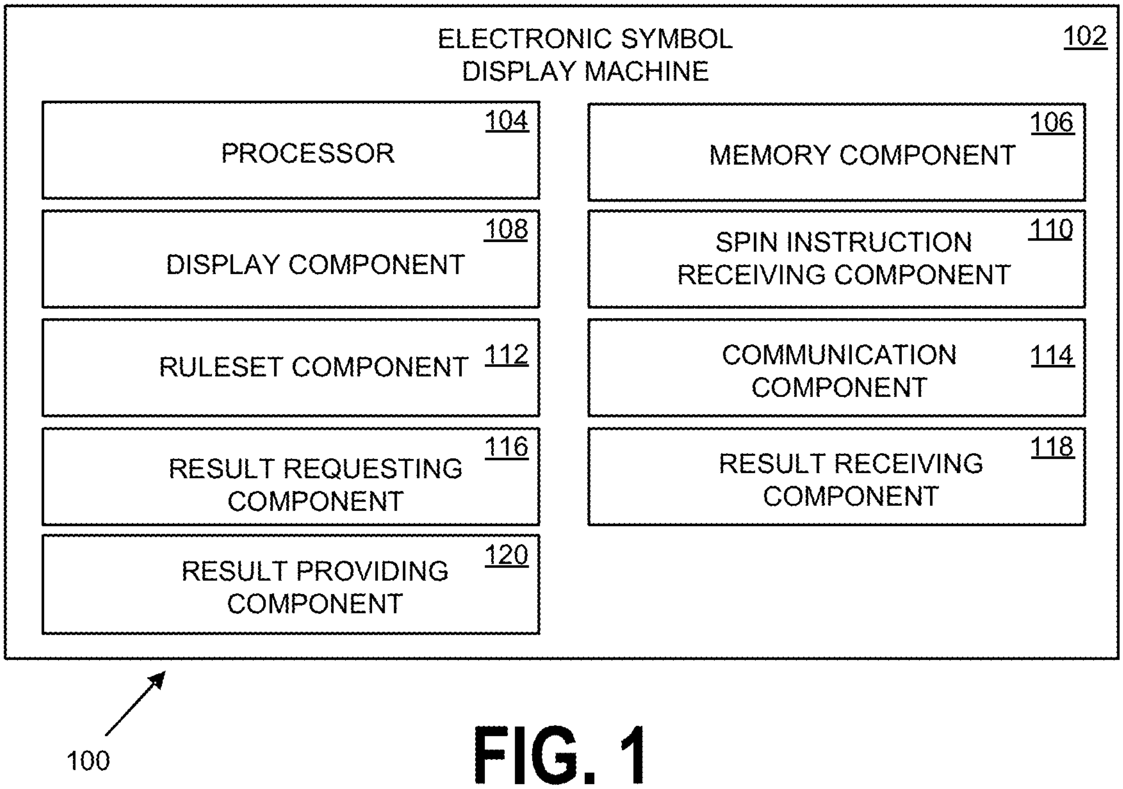
FIG. 1 is a schematic drawing of an electronic symbol display machine, in accordance with example embodiments.

FIG. 1 is a block diagram 100 depicting an electronic symbol display machine 102 arranged to implement operations in accordance with example embodiments described herein. The electronic symbol display machine 102 may take any of a variety of forms, including for example a dedicated machine, a personal computer, a server computer, a personal digital assistant, a mobile phone, a tablet device, or some other computing device.

In some embodiments, the electronic symbol display machine 102 may provide a plurality of rotatable circular strips, with each including a plurality of symbols. Other embodiments may use program instructions (or digital logic in circuitry) to simulate such a plurality of rotatable circular strips. Further, as noted above, electronic symbol display machine 102 need not strictly simulate the rotatable circular strips, and may instead select symbols to display upon each strip from a pool of such symbols. Thus different strips may draw from the same or different pools of symbols, have different sizes (in terms of number of symbols per strip), and may or may not include duplicate symbols.

The electronic symbol display machine 102 may be arranged to implement any of the methods or software applications as described herein. The electronic symbol display machine 102 may include a processor 104 (or multiple processors) arranged to execute the functions of various components, which may be provided by hardware or by software executing on the electronic symbol display machine 102. The software may be stored in a memory component 106, and instructions may be provided to the processor 104 to carry out the functionality of the described components.

In addition to processor 104 and memory component 106, the hardware components may include a display component 108 (e.g., a screen), a spin instruction receiving component 110 (e.g., some form of input modality or device, such as a button, keyboard, mouse, or touchscreen), and a communication component 114 (e.g., a network interface). In the case of instruction receiving component 110 being a touchscreen, instruction receiving component 110 may be part of or the same as display component 108.

The software components may include a ruleset component 112, a result requesting component 116, a result receiving component 118, and a result providing component 120. The software may be divided into components in various ways and more, fewer, or different software components may be present.

The display component 108 may be arranged to provide a display area that may include a matrix of symbols and/or a graphical user interface (GUI) configured to show such a matrix of symbols. Columns of the matrix may represent strips of a mechanical symbol display machine, though electronic symbol display machine 102 provides for more functionality and flexibility in terms of representation, presentation, and display of symbols. As noted, the display area may be provided on a screen associated with the electronic symbol display machine 102.

The spin instruction receiving component 110 may be arranged to receive a spin instruction from a user. A spin instruction may have other parameters or values associated therewith, which the user may be allowed to adjust as desired. A spin instruction may include an indication of how many spins (or, how many iterations of an application involving spins) a user wishes the current systems and methods to process at once. This is further explained below. As noted, spin instruction receiving component 110 may be implemented by way of physical hardware or button appearing on a touchscreen, for example.

The ruleset component 112 may be arranged to store a set of rules (e.g., options) relating to the management of an application operated by the electronic symbol display machine 102. The user may be allowed to select rules and/or variations thereof, or the application may specify the set of rules. Rules may be transmitted to a remote device for implementation, or may be implemented on the electronic symbol display machine 102 itself. As an example, a user may set up a rule that specifies that a synchronized symbol is displayed before or after the user finds out whether a pre-determined patterns of symbols is displayed on the display component 108.

The communication component 114 may be arranged to communicate with a remote device associated with the electronic symbol display machine 102 and/or the application being executed thereon. Communication may include the transmission of rules and requests for data or results, and the receipt of results or data back from the remote device. This communication may take place over a local area network (wired or wireless) or a wide area network (e.g., the Internet).

The result requesting component 116 may be arranged to request, from the remote device, one or more appropriate results to be calculated by the remote device (e.g., by an RNG associated with the remote device). The result receiving component 118 may be arranged to receive, from the remote device, the requested results back from the remote device. The results may already be requested, calculated, and/or provided in accordance with rules in the ruleset component 112.

The result providing component 120 may be arranged to provide the re-ordered and/or modified results to the user, typically via the display component 108 in a visual format (e.g., a matrix of symbols possibly representing a subset of the symbols on rows of horizontally-arranged strips) with or without animations. In other words, the result providing component 120 translates the results received from the remote device (e.g., in binary or textual encoding) into output viewable by a user.

Not shown in FIG. 1 are physical buttons or other actuatable components that facilitate user interaction with electronic symbol display machine 102. In some embodiments, electronic symbol display machine 102 may include one or more currency acceptors (e.g., cash acceptors, token acceptors, and/or card readers) that can be used to cause electronic symbol display machine 102 to carry out iterations of an application (e.g., spins of the strips). Likewise, electronic symbol display machine 102 may also include one or more cash-out actuators that can be used to cause electronic symbol display machine 102 to dispense currency, tokens, or credit a debit or payment card.

Figure 2:
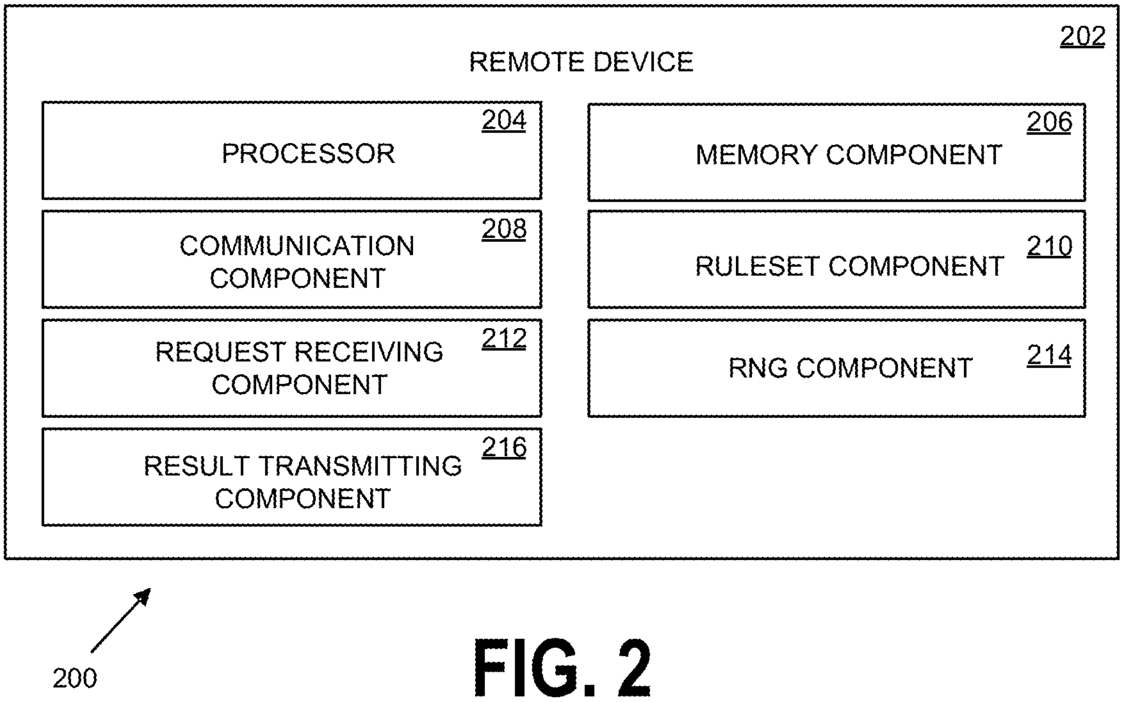
FIG. 2 is a schematic drawing of a remote device, in accordance with example embodiments.

FIG. 2 is a block diagram 200 depicting a remote device 202 arranged to implement operations in accordance with example embodiments described herein. The remote device 202 may take any of a variety of forms, including a physical remote server, a virtual server, a local server (e.g., on the same local area network or segment), a cloud server, or the like.

The remote device 202 may be arranged to implement the remote device methods as described herein. The remote device 202 may include a processor 204 (or multiple processors) arranged to execute the functions of various components, which may be provided by hardware or by software executing on the remote device 202.

In addition to the processor 204 and the memory component 206, the hardware components may include a communication component 208 (e.g., a network interface). The communication component 208 may be arranged to facilitate communication between the remote device 202 and the electronic symbol display machine 102. In practice, many electronic symbol display machines may be in simultaneous data communication with the remote device 202.

The software may be stored in a memory component 206, and instructions may be provided to the processor 204 to carry out the functionality of the described components. The software components can include a ruleset component 210, a request receiving component 212, an RNG component 214, and a result transmitting component 216.

The ruleset component 210 may be arranged to store a set of rules relating to how data of calculated results are to be initially determined or modified prior to being transmitted to the electronic symbol display machine 102. The ruleset component 210 need not form part of the remote device 202 if the electronic symbol display machine 102 has a suitable ruleset component. In some embodiments, some rules may be implemented by the ruleset component 210 of the remote device 202, and some rules by the ruleset component 112 of the electronic symbol display machine 102. A set of rules in the ruleset component 210 may be configured or hard-coded for a particular application, or may be received from the electronic symbol display machine 102 for a specific software application.

The request receiving component 212 may be arranged to receive a request for one or more results from the electronic symbol display machine 102. The request may seek randomly generated results and may be received by way of a local area network (wired or wireless) or a wide area network.

The RNG component 214 may be arranged to generate at least part of the requested results or to facilitate calculation of such results. Herein, the RNG component may be a pseudo-RNG that produces deterministic sequences of numbers that appear random or have statistical characteristics of random numbers. Example pseudo-RNGs could be based on a linear congruential expression or output of a cryptographic hash. On the other hand, the RNG component may be a true RNG that determines non-deterministic sequences of random numbers from measurements of random physical phenomena. Examples of these physical phenomena include atmospheric noise, noise from hardware components (e.g., thermal noise from a resistor, breakdown noise from a Zener diode), radioactive decay, quantum fluctuations in a vacuum, etc.

The result transmitting component 216 may be arranged to transmit the results back to the electronic symbol display machine 102. This transmission may take place by way of a local area network (wired or wireless) or a wide area network.

Figure 3:
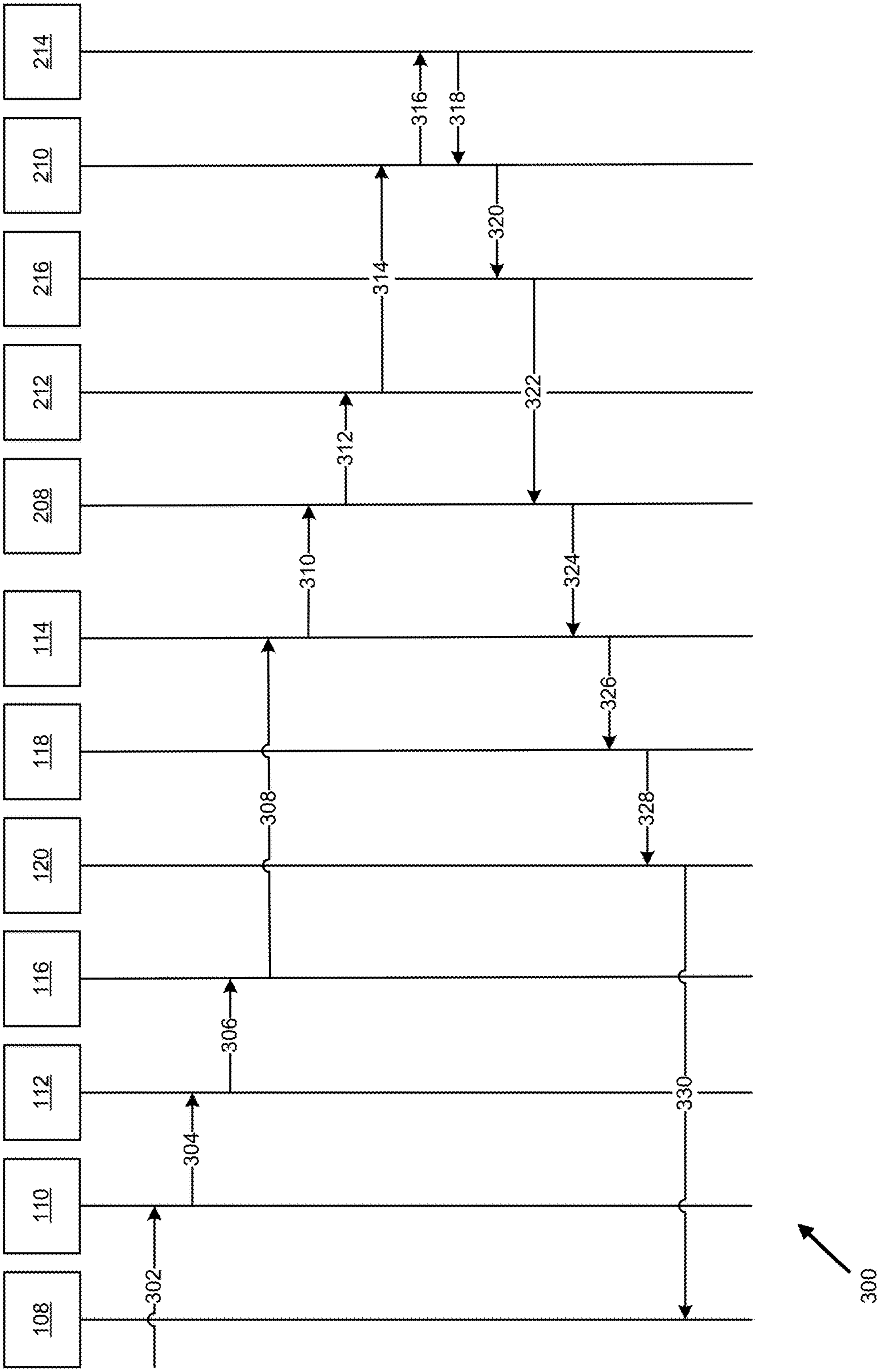
FIG. 3 is a message flow diagram, in accordance with example embodiments.

FIG. 3 is a message flow diagram 300 that depicts an example transaction between electronic symbol display machine 102 and remote device 202. The components of electronic symbol display machine 102 are shown to the left of FIG. 3 and the components of remote device 202 are shown to the right of FIG. 3. It is assumed, but not shown, that there is a network connecting electronic symbol display machine 102 and remote device 202. Notably, message flow diagram 300 depicts just one possible example transaction, and other transactions involving different communication steps and/or orderings of messages may be possible.

As indicated by arrow 302, a user may actuate spin instruction receiving component 110. As indicated by arrow 304, spin instruction receiving component 110 may provide the spin instruction to ruleset component 112. Ruleset component 112 may determine how such a spin is to be carried out (e.g., in accordance with applicable rules). In doing so, ruleset component 112 may also determine that one or more results should be requested from remote device 202.

As indicated by arrow 306, ruleset component 112 may invoke result requesting component 116 to obtain such results from remote device 202. Accordingly, as indicated by arrow 308, result requesting component 116 may provide a result request to communication component 114. As indicated by arrow 310, communication component 114 may transmit the result request to communication component 208 of remote device 202.

As indicated by arrow 312, communication component 208 may provide the result request to request receiving component 212. As indicated by arrow 314, request receiving component 212 may provide the result request to ruleset component 210. Ruleset component 210 may determine, from the result request, how to generate the result and/or the format of the result. As part of this process, ruleset component 210 may invoke RNG component 214.

Accordingly, as indicated by arrow 316, ruleset component 210 may request one or more random numbers from RNG component 214. As indicated by arrow 318, RNG component 214 may provide these random numbers to ruleset component 210. Ruleset component 210 may uses these random numbers to form a result.

As indicated by arrow 320, ruleset component 210 may provide the result to result transmitting component 216. At indicated by arrow 322, result transmitting component 216 may provide the result to communication component 208. At indicated by arrow 324, communication component 208 may transmit the result to communication component 114 of electronic symbol display machine 102.

As indicated by arrow 326, communication component 114 may provide the result to result receiving component 118. As indicated by arrow 328, result receiving component 118 may provide the result to result providing component 120. Result providing component 120 may use the result to generate an outcome for the application, including one or more animated displays. Accordingly, as indicated by arrow 330, result providing component 120 may provide an indication of this output to display component 108. Display component 108 may graphically present this outcome to the user.

Variations of message flow 300 may be used. For example, some embodiments may not require that both electronic symbol display machine 102 and remote device 202 access their respective ruleset components when generating and/or obtaining a result. In further embodiments, the functions of electronic symbol display machine 102 and remote device 202 may be carried out by a single device (e.g., by adding at least RNG component 214 to electronic symbol display machine 102), and thus various embodiments may be carried out in a standalone device.

II. Example Application Features and Operation

The embodiments herein provide improvements over mechanical symbol display machines in addition to other possible advantages. As noted above, such a mechanical device may display a number of columns or rows (herein columns will be assumed for sake of simplicity) formed by circular strips of symbols. Only a portion of the symbols per strip are displayed at any one time (e.g., 1-5 symbols per strip) and the remaining symbols of each strip are effectively hidden by the mechanical symbol display machine. Thus, a "grid" of symbols may be displayed.

A "spin" of the mechanical symbol display machine may result in rotation of at least some of the strips so that a different pattern of symbols may be displayed, the pattern defined by where the strips stop in their respective rotations. One or more "lines" across the display of mechanical symbol display machine may define the locations of symbols to be considered as a "pattern" (typically one symbol per strip). Multiple lines per display may be present.

Given the fixed nature of the symbol arrangements on each strip, the number of patterns of symbols displayed by a mechanical symbol display machine is limited. Certain patterns of symbols will be impossible to display or otherwise invalid. This restricts the usage and utility of such a machine.

On the other hand, an electronic symbol display machine can be arranged to simulate the operation of a mechanical symbol display machine, but without such restrictions. Thus, the capabilities of an electronic symbol display machine can exceed those of a mechanical symbol display machine.

Figure 4:
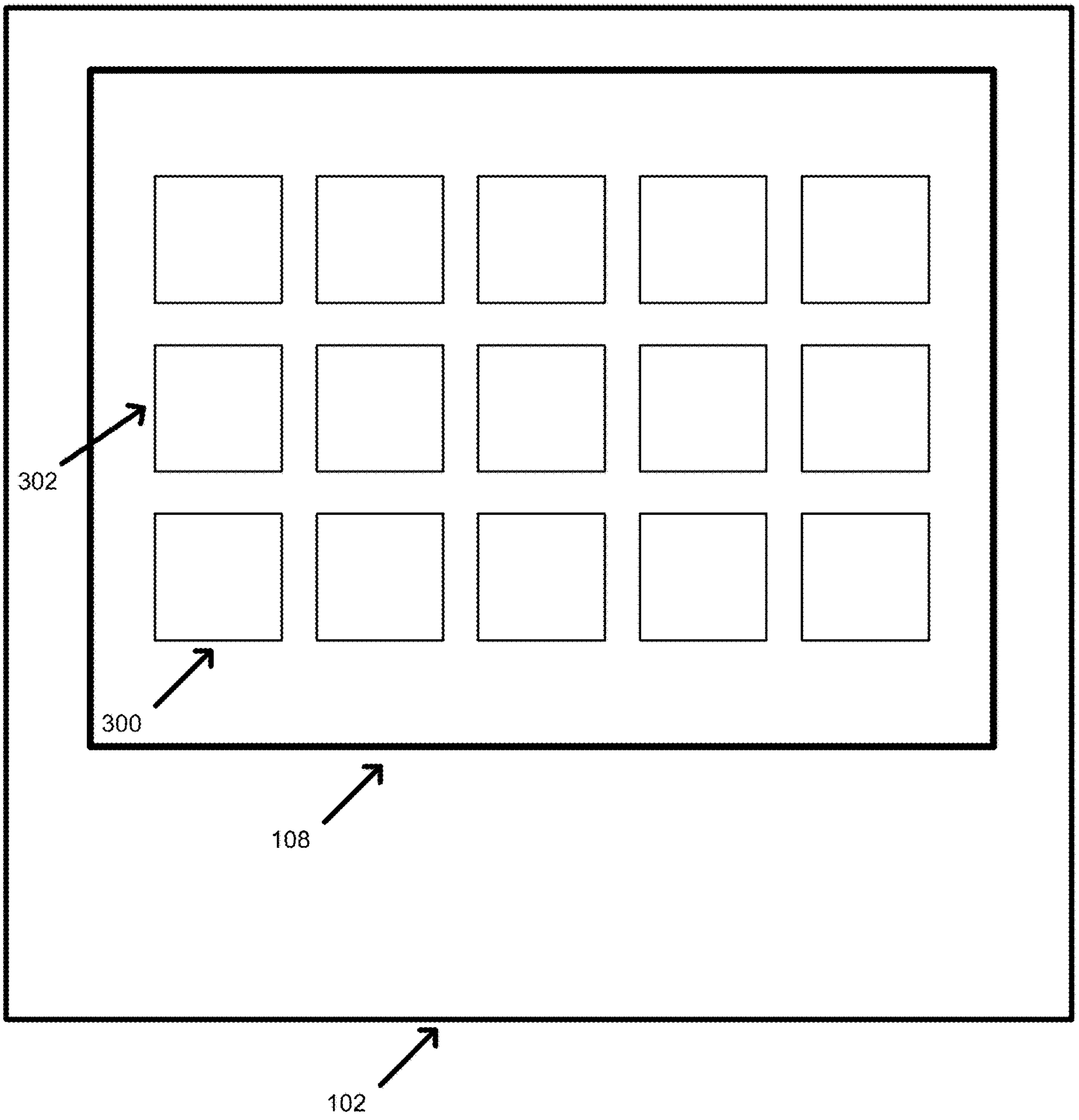
FIG. 4 depicts a graphical user interface of an electronic symbol display machine, in accordance with example embodiments.

As depicted in FIG. 4, display component 108 on an electronic symbol display machine 102 shows a rectangular three-by-five array 300 of symbol positions 302 (three rows and five columns). Although the array 300 of symbol positions 302 is depicted as a three-by-five rectangular grid, other arrangements are possible.

Because of the lack of restrictions in an electronic symbol display machine, the symbol arrangement per column can be fixed or dynamic. For instance, a dynamic symbol arrangement can change before, during, or after a spin is initiated, thus allowing any pattern of symbols to appear within the symbol positions 302 of array 300. Further, the pool of symbols that can appear in each column can be of different sizes and/or contain different numbers of symbols, including duplicate symbols.

A spin may involve simulating the rotation of one or more of the logical strips using an RNG, for example, and displaying an animation of the rotation(s) to the user. The outcome of such a spin (and the result of the animation) may be a set of symbols displayed, one or more per column, in an array. Lines may still be used to define locations of symbols that are to be considered for conformance with a pre-determined pattern.

Certain pre-determined patterns of symbols appearing along a line may trigger or otherwise cause the electronic symbol display machine to carry out additional operations. For instance, if the same symbol appears on some number of adjacent columns and along a line, the electronic symbol display machine may display further information, replace displayed symbols with other symbols, perform additional spins(s), interact with the user in some fashion, or physically dispense one or more objects for the user to gather. Some symbols may have different "values" or different functionalities with respect to causing the additional operations. Notably, not all of the listed additional operations are possible with a mechanical symbol display machine, the replacement of symbols being one example.

Figure 5:
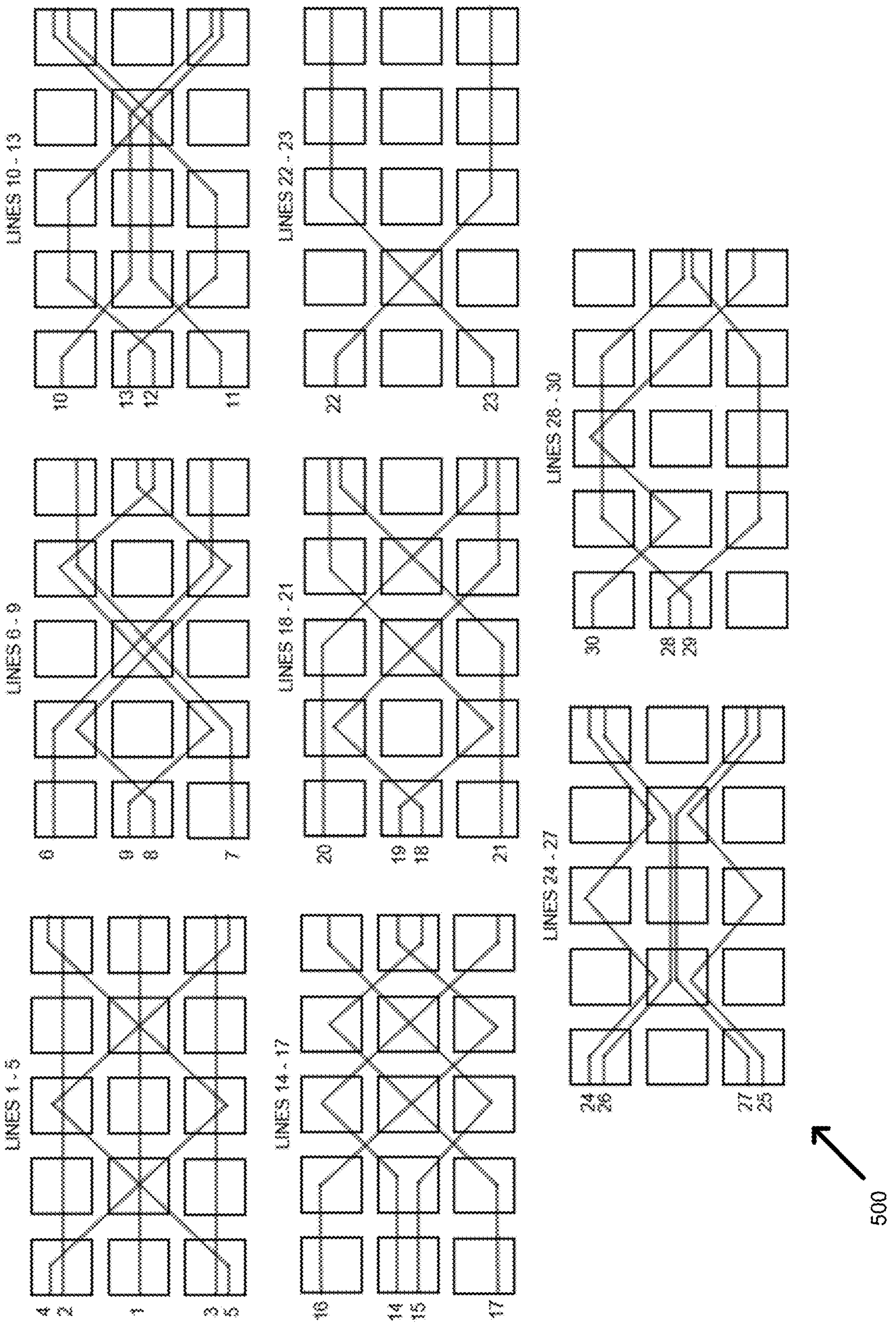
FIG. 5 is set of lines along which pre-determined patterns of symbols can be formed, in accordance with example embodiments.

FIG. 5 depicts a number of possible line configurations 500. Notably, lines need not follow the rows of the grid. Multiple pre-determined patterns may be matched on multiple lines.

Nonetheless, in some cases, a pre-determined pattern may simply be that the same symbol appears a number of in adjacent columns (e.g., three or more), starting from the leftmost strip, and/or from the rightmost column. Thus, no specific line for symbols to land on needs to be used or displayed. Generally, pre-determined patterns require a trail of at least three symbols in adjacent columns. Pre-determined patterns of different lengths may cause the electronic symbol display machine to carry out different operations, with longer symbol trails generally taking precedence over shorter symbol trails for purposes of matching symbols to a pre-determined pattern. Some variations may, however, have special symbols which need not be on a line, and the mere fact that one or more such symbols are shown on the display results in those symbols being considered part of a pre-determined pattern. Other pre-determined patterns of symbols can take on additional forms and need not require all symbols to be identical.

Some particular embodiments facilitated by an electronic symbol display machine include the following. In response to a particular pre-determined pattern of symbols being displayed as the result of a spin, the pre-determined pattern is removed from the display and the resulting vacant symbol positions are filled by replacement symbols. An RNG may be used to: (i) determine whether all replacement symbols are to be the same (synchronized), and (ii) if so, determine the replacement symbol. Then the electronic symbol display machine fills all of the vacant symbol positions with the synchronized replacement symbol. If the replacement symbols are determined to be not all the same, the RNG may be used to determine each replacement symbol independently.

In an alternative embodiment, the electronic symbol display machine may use an RNG to determine the replacement symbol first, and possibly display it to the user. Then the electronic symbol display machine may use the RNG to determine whether to synchronize the replacement symbols. If the symbols are to be synchronized, the determined replacement symbol is used. If not, the RNG may be used to determine each replacement symbol independently.

In some cases, replacing symbols may involve a cascading feature. When a symbol combination matching one or more pre-determined patterns appears in the array of symbols, all symbols that form part of the pre-determined patterns are removed from the array, and therefore from the display. Symbols then drop down (i.e., cascade) into the now vacant symbol positions, with new symbols appearing on the display and onto the array from the top of the array.

Implementations of the cascading feature either use the next symbol(s) on the simulated strips as replacement symbols, or perform another calculation to select which part of the simulated strips will be used to display replacement symbols. A random segment of a simulated strip may thus be used to populate the empty area on the display. Where only a single symbol is needed, a single symbol on the strip may be selected. However, where two or more symbols need to be replaced in a single column, these symbols may be adjacent symbols on the simulated strip. Again, electronic symbol display machines are not limited in this fashion.

Figure 6A:
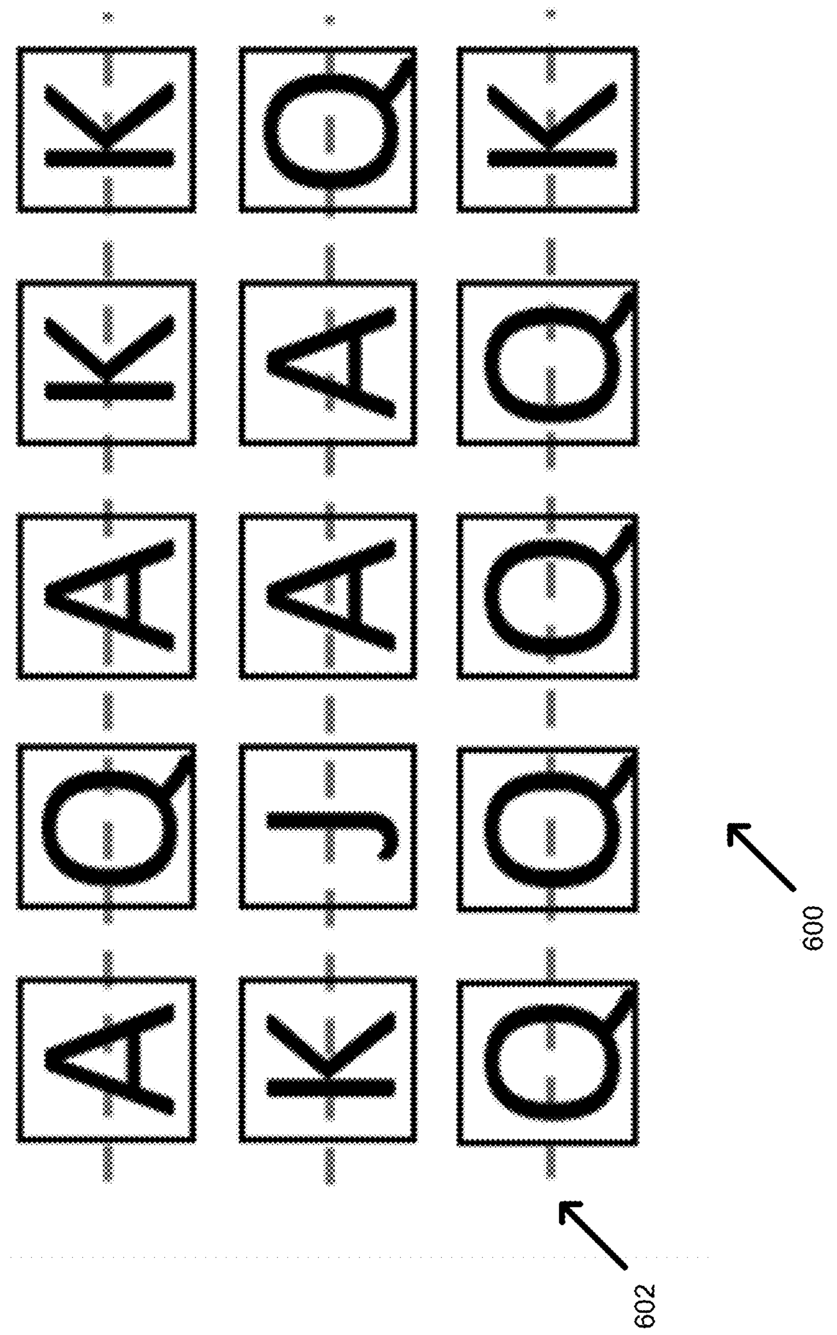
FIGS. 6A, 6B, and 6C depict a series of graphical user interfaces of an electronic symbol display machine, in accordance with example embodiments.
Figure 6B:
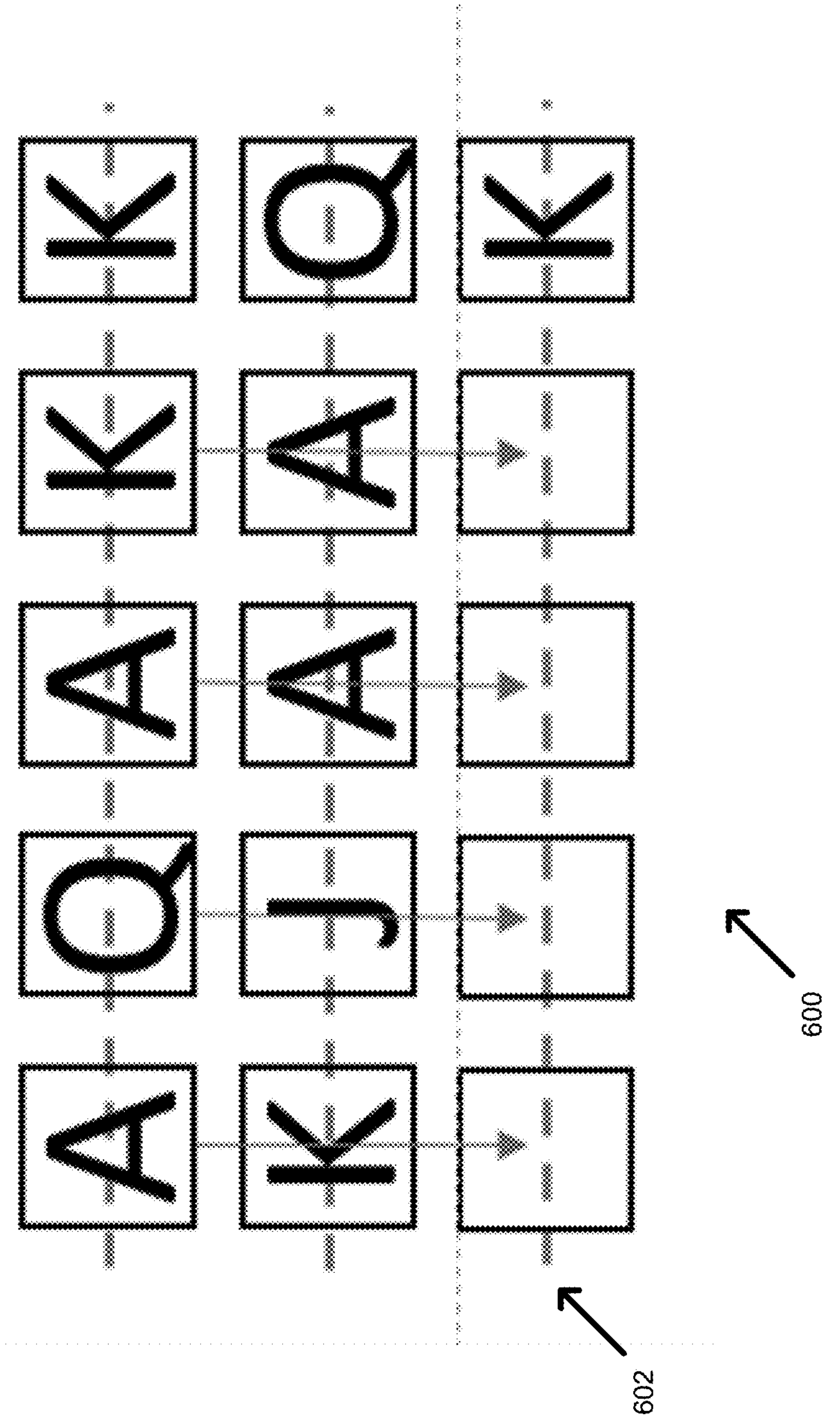
Figure 6C:
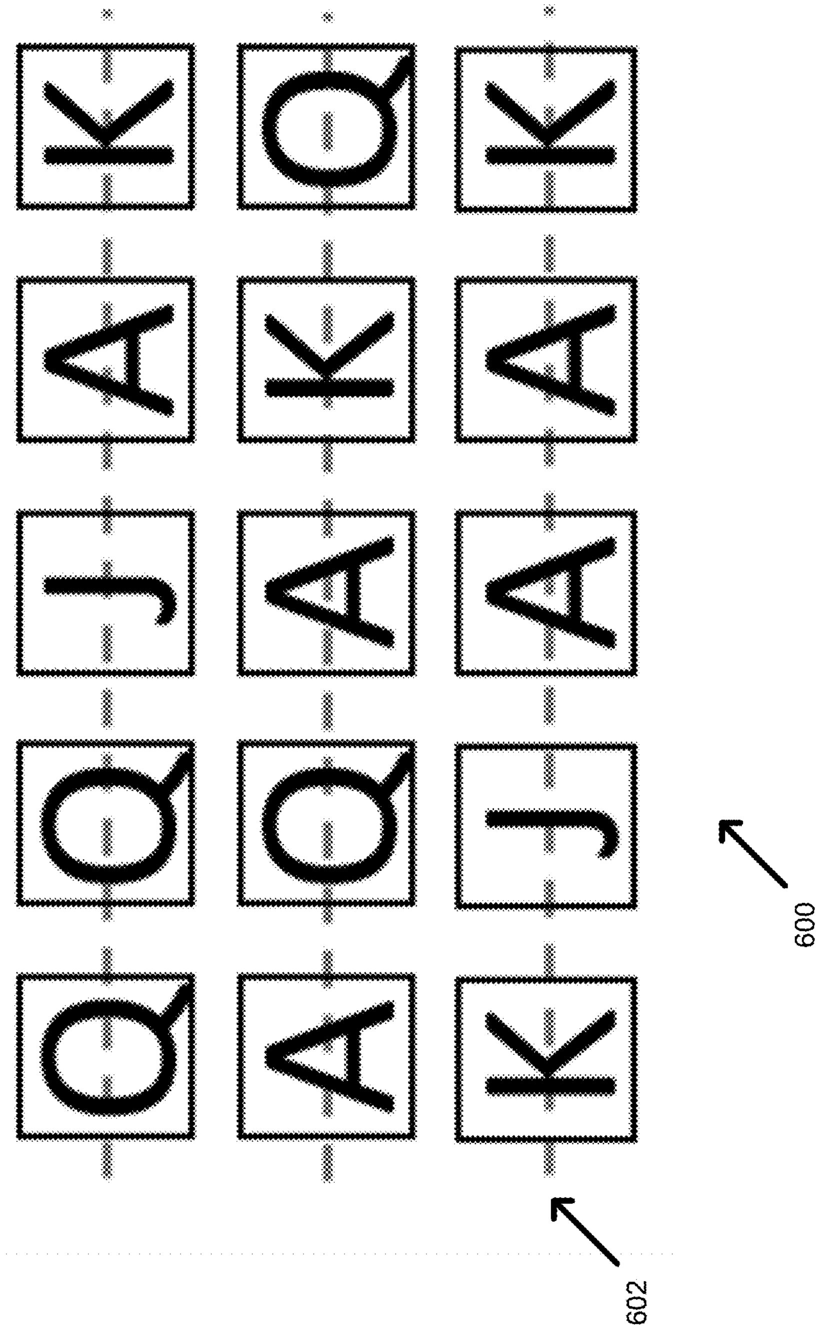

An example of the cascading feature is shown in FIGS. 6A, 6B, and 6C. In FIG. 6A, an array 600 of symbol positions is shown, along with example lines. Here, the lines are all horizontal, but any combination of lines, such as those shown in FIG. 5, may be used. After a spin, four Q symbols are aligned along the lower line 602 in adjacent columns. This matches a pre-determined pattern.

FIG. 6B depicts the four Q symbols that form the pre-determined pattern being removed from array 600. As indicated by the downward arrows, the symbols above the removed symbols fall down into the vacant symbol positions left by the removed symbols.

FIG. 6C depicts the symbols K, J, A, and A having dropped down to fill the vacant symbol positions in the lowest row. The symbols A, Q, A, K have dropped down from the top row to the middle row, and the symbols Q, Q, J, A have appeared in array 600 and are now in the top row. As explained above, the new symbols on the top row of the grid may have been next in line on the simulated strips, or may have been randomly chosen from applicable pools of symbols by an RNG.

When the cascading feature is present, each cascade may generate symbols matching a pre-determined pattern. If this happens, these symbols are also removed to create further vacant symbol positions, and the cascading feature continues until all vacant symbol positions are filled and no pre-determined patterns are displayed.

One possible implementation and use of an electronic symbol display machine is for a reel-based game. Such a game may include a grid of symbols on a display. Columns of the grid each have a corresponding reel (strip), each reel including a plurality of symbols. For every play of the game (i.e., every "spin" of reels initiated by a user), an RNG determines which part of the reels will be displayed on the grid (i.e., where the reels will "stop" on the display). Movement is simulated to the user, with symbols coming to rest on the display in accordance with the RNG's determinations. Movement typically simulates the spinning of traditional mechanical symbol display machines.

In such a reel-based game, the goal of the user is to obtain a winning combination of symbols on the display. Each winning combination may be a pre-determined pattern of symbols. The symbols of a slot game generally each have a unique value, with higher value symbols having an associated higher pay-out value than lower value symbols.

As discussed above, a winning combination may be when matching symbols line up along any line of an array of symbols. These types of reel-based games may be called "lines" games. The combination may need to start on the left-most column, with adjacent symbols along the line to the right thereof. In some games, the combination may also start from the right, with adjacent symbols on the pay line to the left thereof.

Also as discussed above, a winning combination may simply be that the same symbol appears in adjacent columns, starting from the leftmost column, and/or from the rightmost column in some reel-based games. These types of games are often referred to as "all ways pays", or "ways" games, as no specific line is provided that symbols need to land on.

III. Example Symbol Synchronization and Replacement

The embodiments herein involve operations that go beyond what is possible with traditional mechanical symbol display machines. Symbol synchronization involves all symbols that are to be replaced being replaced by the same symbol (the synchronized replacement symbol or "sync" symbol). The cascading feature may be optionally integrated such an arrangement, with the symbol replacement taking place after one or more steps of the cascading and/or when the cascading finishes.

Transactions between electronic symbol display machine 102 and remote device 202, perhaps similar to those of FIG. 3, may take place as needed to support these features. Results of spins and/or cascades may be being determined by remote device 202, and RNG component 214 may generate random numbers to support these determinations.

Two different variations of symbol synchronization and replacement are described below. Other variations may exist.

A. Early Determination and Display of the Sync Symbol

Figure 7:
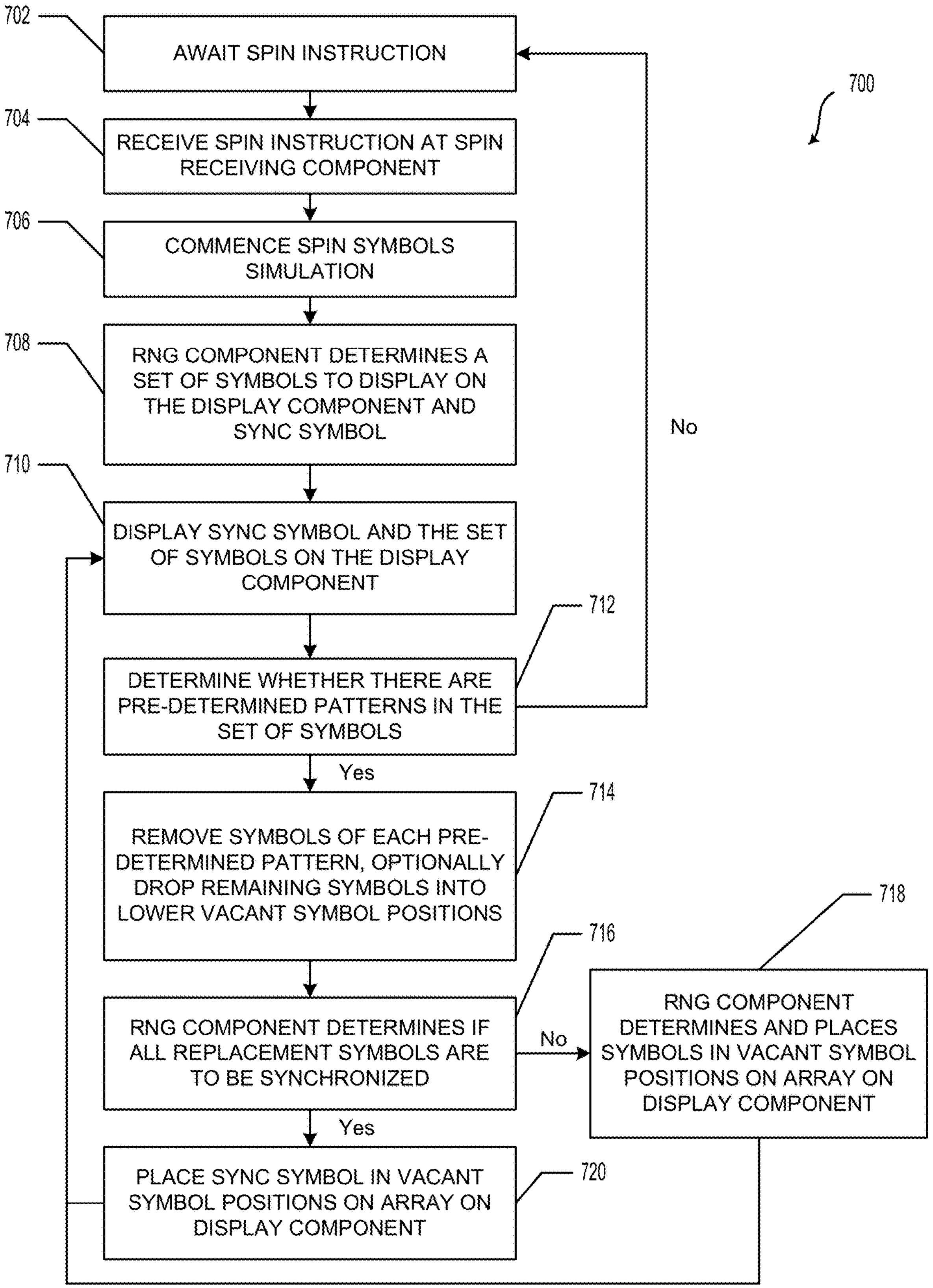
FIG. 7 is a flow chart, in accordance with example embodiments.

FIG. 7 illustrates a flow chart 700 involving early determination and display of a sync symbol that can be used as a synchronized replacement symbol. In some example embodiments, flow chart 700 may include fewer or more steps or blocks than those expressly illustrated or otherwise disclosed herein. Furthermore, respective steps or blocks of flow chart 700 may be performed in different order as compared to the order illustrated in FIG. 7.

Block 702 may involve electronic symbol display machine 102 awaiting a spin instruction. During this period, electronic symbol display machine 102 may display interstitial animations on display component 108, for example.

Block 704 may involve receiving a spin instruction at spin receiving component 110, e.g., from a user. As noted above, spin receiving component 110 may include an input modality of electronic symbol display machine 102, such a button, mouse, keyboard, or touchscreen.

Block 706 may involve commencing a spin symbols simulation in response to the spin instruction. This may include at least some steps of the transaction illustrated in FIG. 3, notably, electronic symbol display machine 102 requesting a result from remote device 202.

Block 708 may involve RNG component 214 of remote device 202 generating random numbers that ultimately are used to determine a set of symbols for electronic symbol display machine 102. At this block, or possibly as a sub-step or a separate block, RNG component 214 may also generate a sync symbol. The sync symbol may be selected from a pool of possible sync symbols. In some cases, this pool may include all symbols displayable on electronic symbol display machine 102. In other cases, the pool of possible sync symbols may include symbols not otherwise displayed on electronic symbol display machine 102. This may include at least some steps of the transaction illustrated in FIG. 3, notably, remote device 202 generating one or more random numbers, using these random numbers to determine results, and providing these results to electronic symbol display machine 102.

Block 710 may involve electronic symbol display machine 102 displaying the sync symbol and the set of symbols on display component 108, e.g., in an array. In some cases, the sync symbol and the set of symbols may be displayed simultaneously. In other cases, the sync symbol may be displayed first and then there may be a delay before the set of symbols are displayed. It is also possible for the sync symbol to be displayed after the set of symbols.

Block 712 may involve determining whether there are one or more pre-determined patterns in the set of symbols. If not, then control passes to block 702. If so, control passes to block 714.

Block 714 may involve removing symbols from each of the pre-determined patterns from the set of symbols as displayed, forming vacant symbol positions. If the cascading feature is activated, symbols above the vacant symbol positions may drop down to fill the vacant symbol position, thus forming other vacant symbol positions at or near the top of display component 108.

Block 716 may involve RNG component 214 generating one or more random numbers that ultimately are used to determine whether all replacement symbols are to be synchronized. This may also include at least some steps of the transaction illustrated in FIG. 3, notably, electronic symbol display machine 102 requesting a result from remote device 202, remote device 202 generating one or more random numbers, using these random numbers to determine a result (whether the replacement symbols are synchronized), and providing this result to electronic symbol display machine 102.

If the replacement symbols are not to be synchronized, then block 718 may involve RNG component 214 generating random numbers that ultimately are used to determine replacement symbols. This may also include at least some steps of the transaction illustrated in FIG. 3, notably, electronic symbol display machine 102 requesting a result from remote device 202, remote device 202 generating one or more random numbers, using these random numbers to determine results (the replacement symbols), and providing these results to electronic symbol display machine 102. Electronic symbol display machine 102 may display these replacement symbols in the vacant symbol positions shown on display component 110.

If the replacement symbols are to be synchronized, then block 720 may involve electronic symbol display machine 102 placing the sync symbol in each of the vacant symbol positions shown on display component 110.

From blocks 718 and 720, control passes to block 710. Thus, the operations of blocks 710, 712, 714, 716, 718, and 720 may iterate zero or more further times based on whether one or more pre-determined patterns are matched after each symbol replacement.

FIGS. 8A through 8H provide steps of an example spin as displayed on electronic symbol display machine 102, in accordance with the procedure set forth by FIG. 7. The focus of these figures is on what information gets displayed—the methods used to generate the information displayed have been described above. The discussion of these figures is intended to be illustrative and not limiting.

Figure 8A:
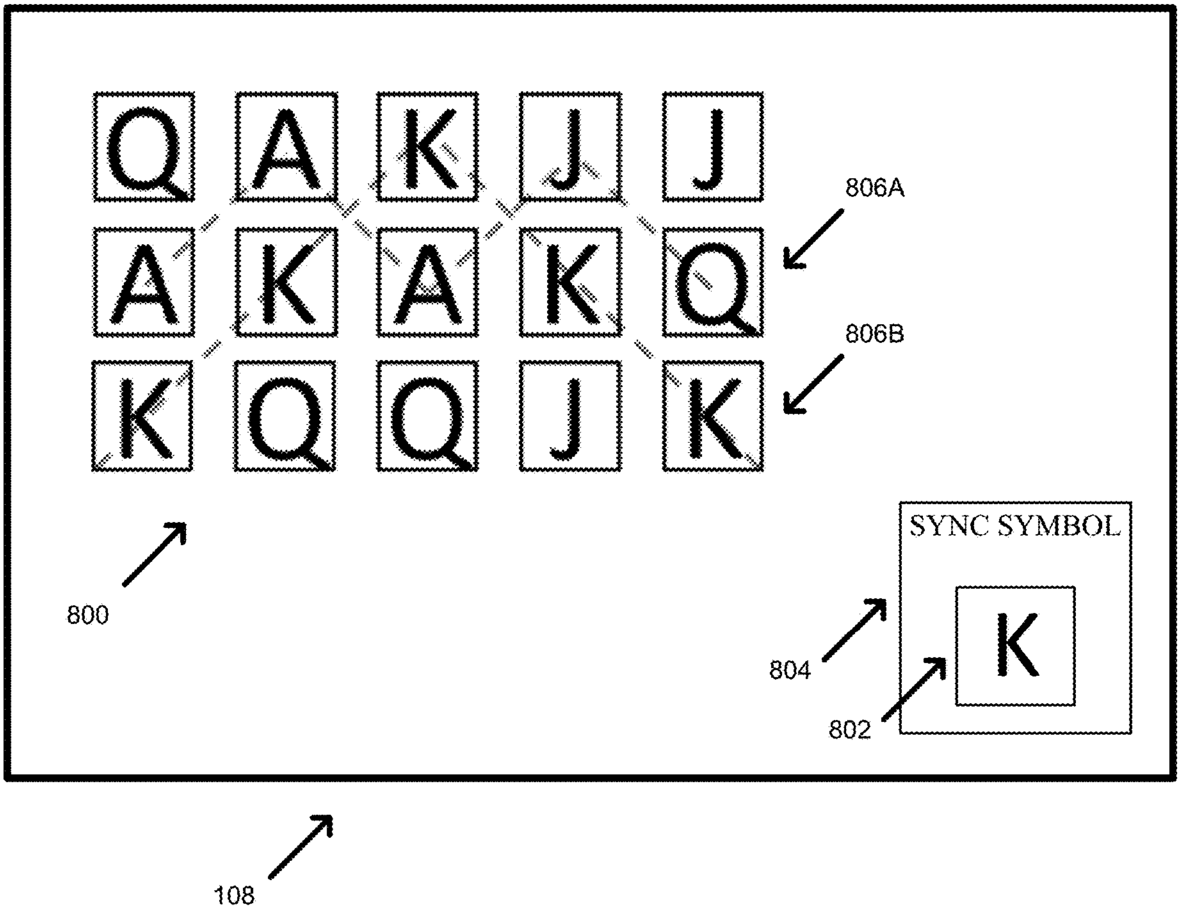
FIGS. 8A, 8B, 8C, 8D, 8E, 8F, 8G, and 8H depict a series of graphical user interfaces of an electronic symbol display machine, in accordance with example embodiments.

FIG. 8A depicts a graphical user interface on display component 108 after a simulated spin. A set of symbols 800 and a sync symbol 802 (K) are shown. Sync symbol 802 appears in a preview space 804. The dashed lines 806A and 806B are some of the lines used to ascertain whether pre-determined patterns of symbols are present. In this case, set of symbols 800 includes two pre-determined patterns of symbols, AAA along line 806A and KKKKK along line 806B.

Figure 8B:
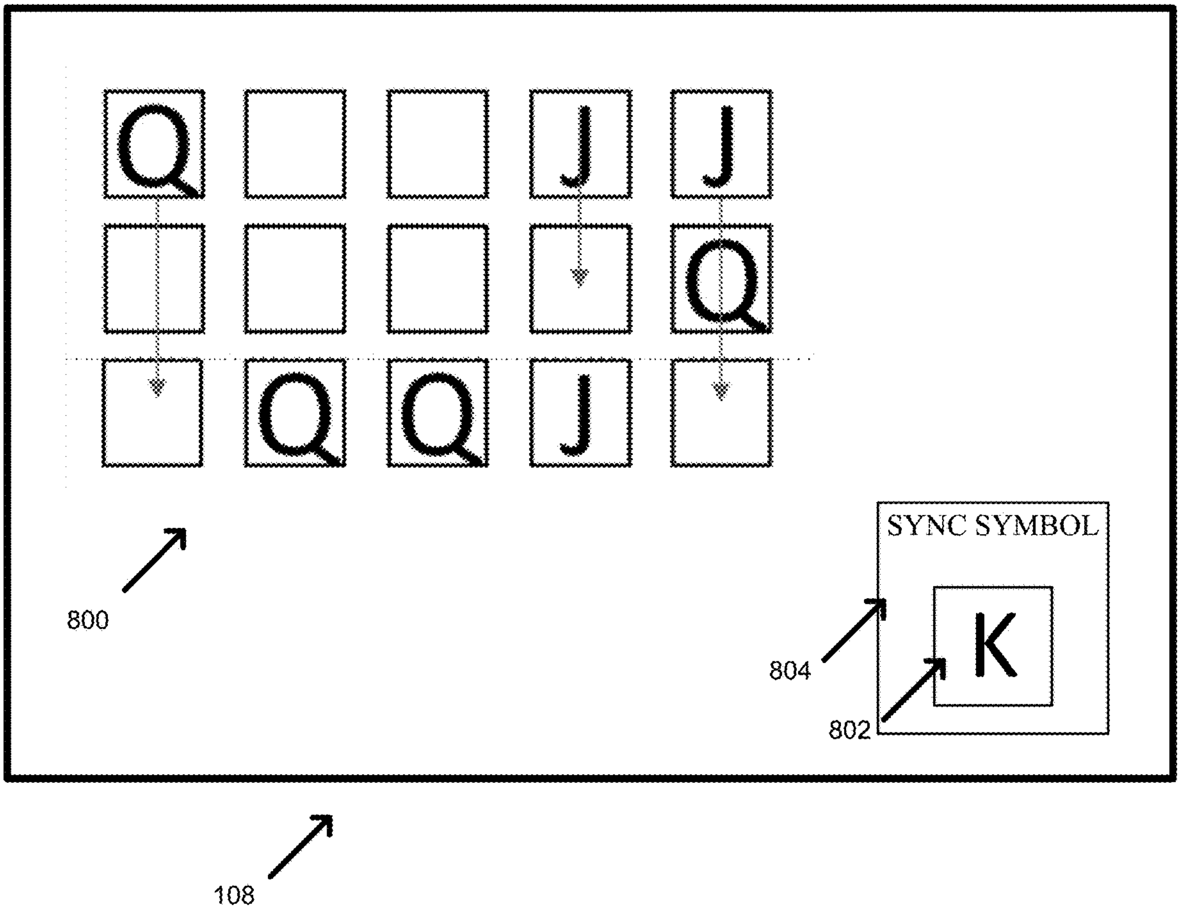

FIG. 8B depicts a graphical user interface on display component 108 after the pre-determined patterns shown in FIG. 8A are removed. Thus, the positions in which the symbols of these patterns were formerly located are shown as vacant. Further, it is assumed that the cascading feature is activated. Thus, any symbols above the vacant symbol locations drop down to fill these locations, as indicated by the down arrows.

Figure 8C:
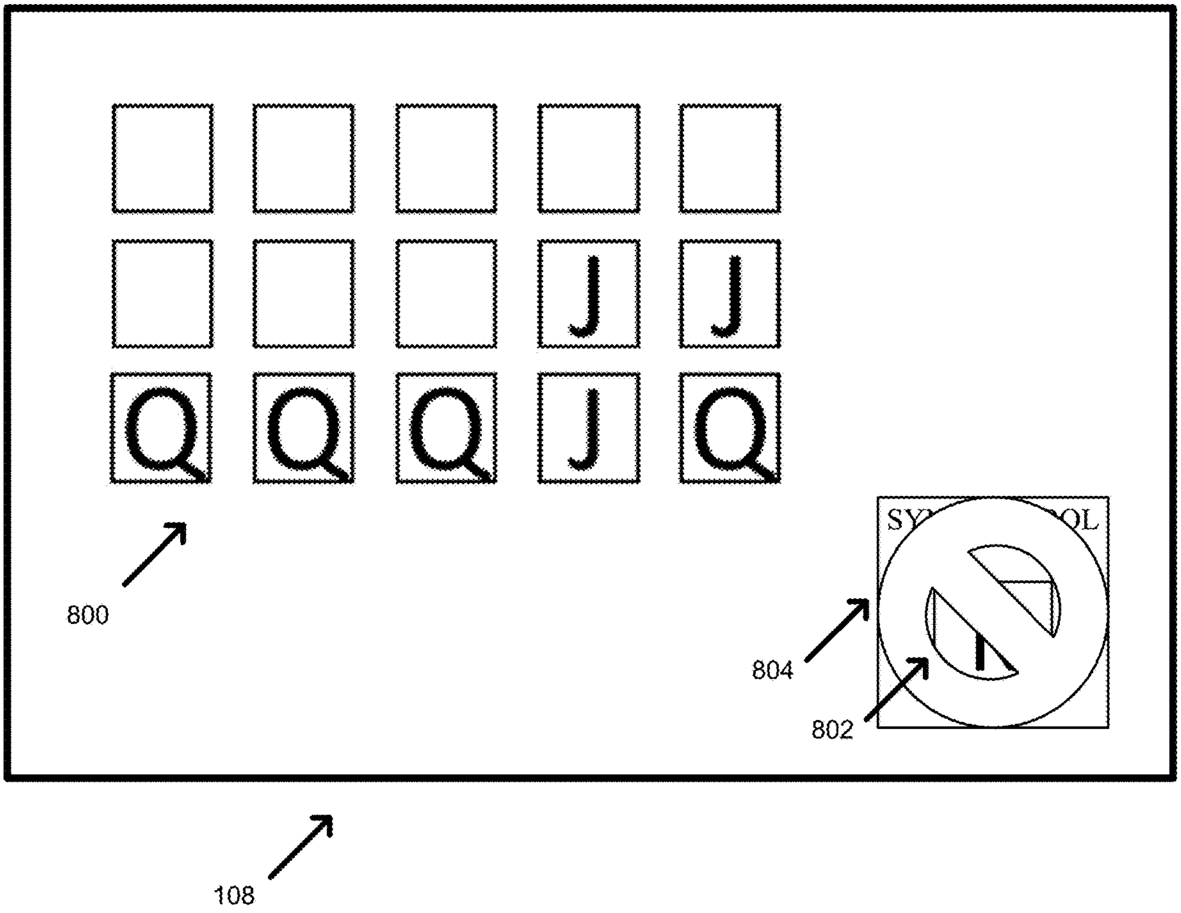

FIG. 8C depicts a graphical user interface on display component 108 after the cascading feature is applied to the symbols shown in FIG. 8B. Thus, all symbols are part of a vertical stack of one or more symbols starting from the bottom row displayed on display component 108, with any vacant symbol positions above these stacks. Further, FIG. 8C shows sync symbol 802 covered by an icon with a negative connotation, indicating that the replacement symbols used to fill the empty symbol positions will not be synchronized.

Figure 8D:
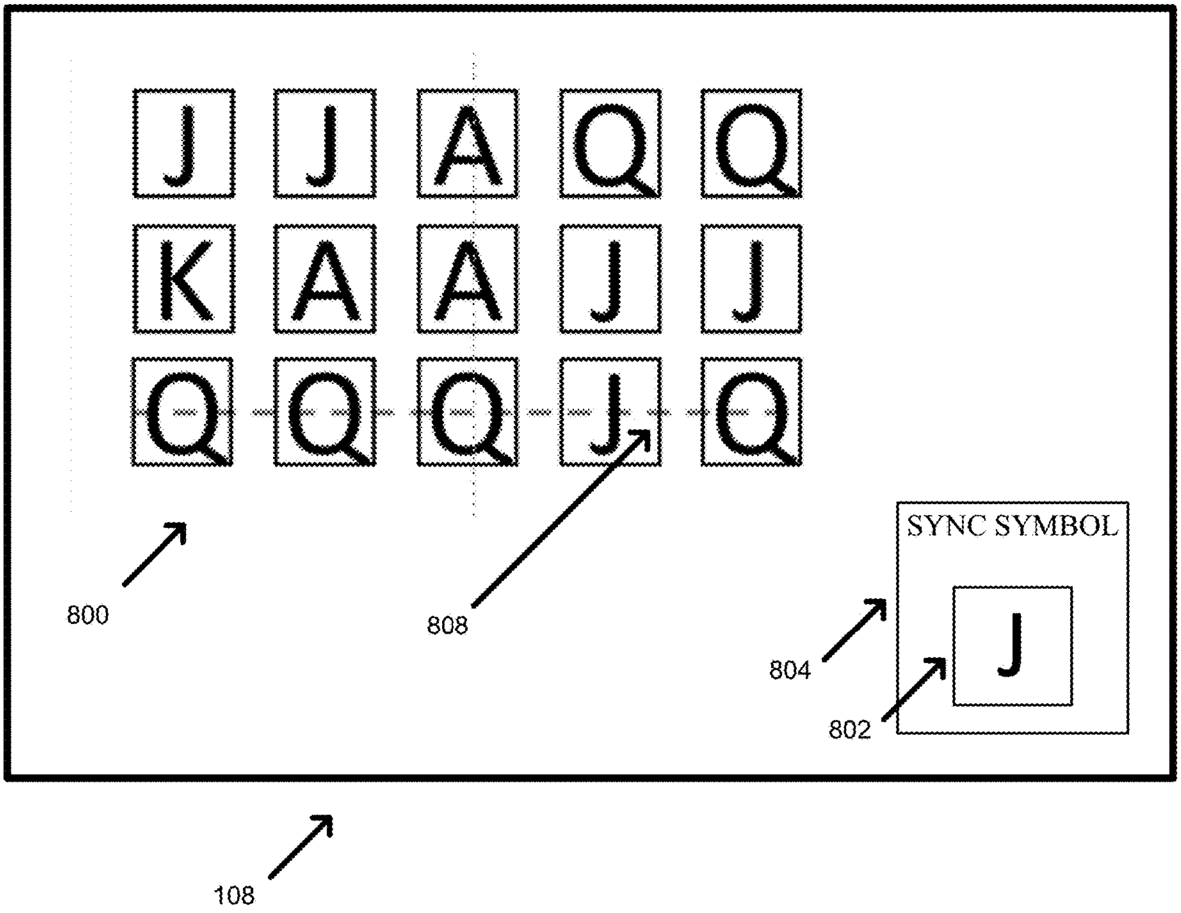

FIG. 8D depicts a graphical user interface on display component 108 after the vacant symbol positions shown in FIG. 8C are filled (e.g., by the next symbols in a segment of simulated strips or randomly chosen symbols). The dashed line 808 is one of the lines used to ascertain whether pre-determined patterns of symbols are present. In this case, set of symbols 800 includes a pre-determined pattern of symbols, QQQ along line 808. A new sync symbol 802 (J) is also shown.

Figure 8E:
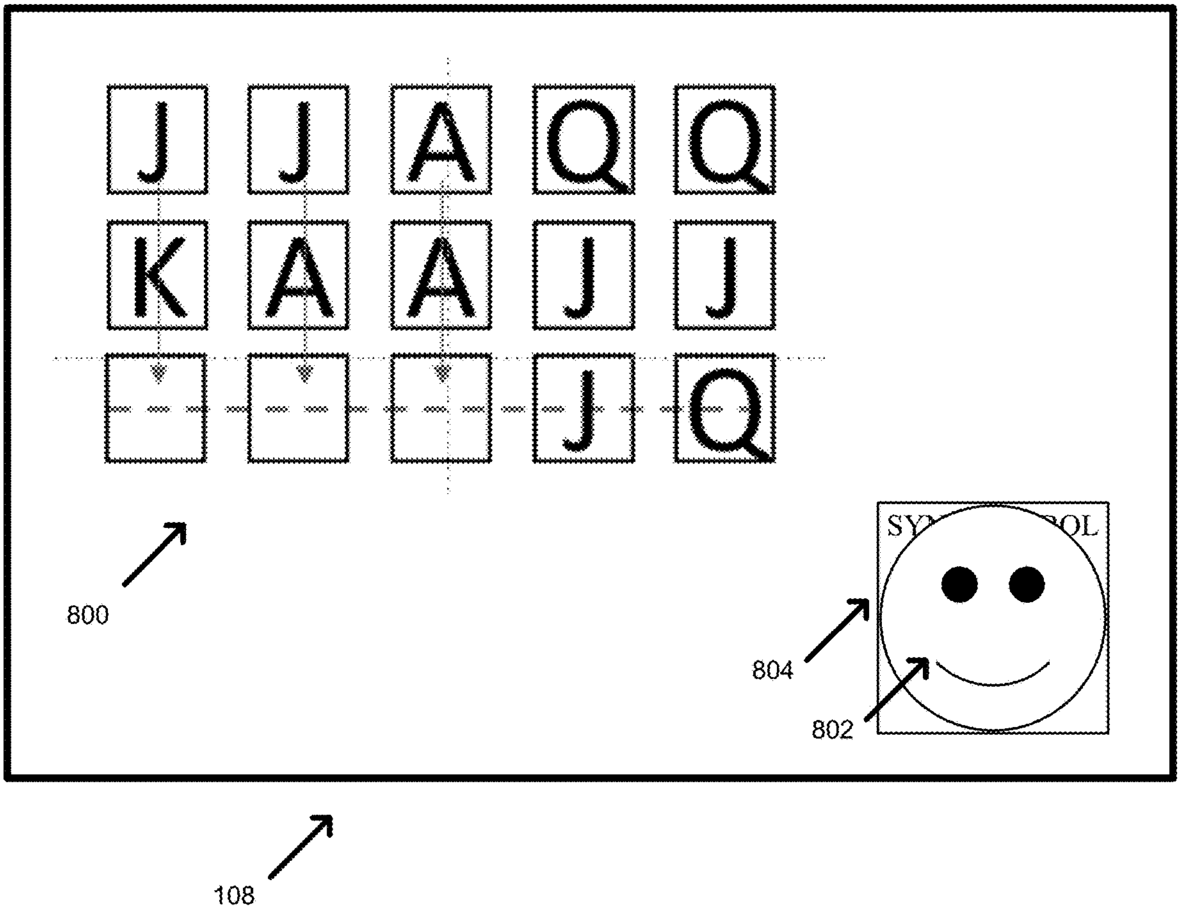

FIG. 8E depicts a graphical user interface on display component 108 after the pre-determined pattern of symbols from FIG. 8D are removed. Thus, the positions in which the symbols of these patterns were formerly located are shown as vacant. Further, it is assumed that the cascading feature is activated. Thus, any symbols above the vacant symbol locations drop down to fill these locations, as indicated by the down arrows. Additionally, FIG. 8E shows sync symbol 802 covered by an icon with a positive connotation, indicating that the replacement symbols used to fill the empty symbol positions will be synchronized (the sync symbol appearing below the icon is still a J).

Figure 8F:
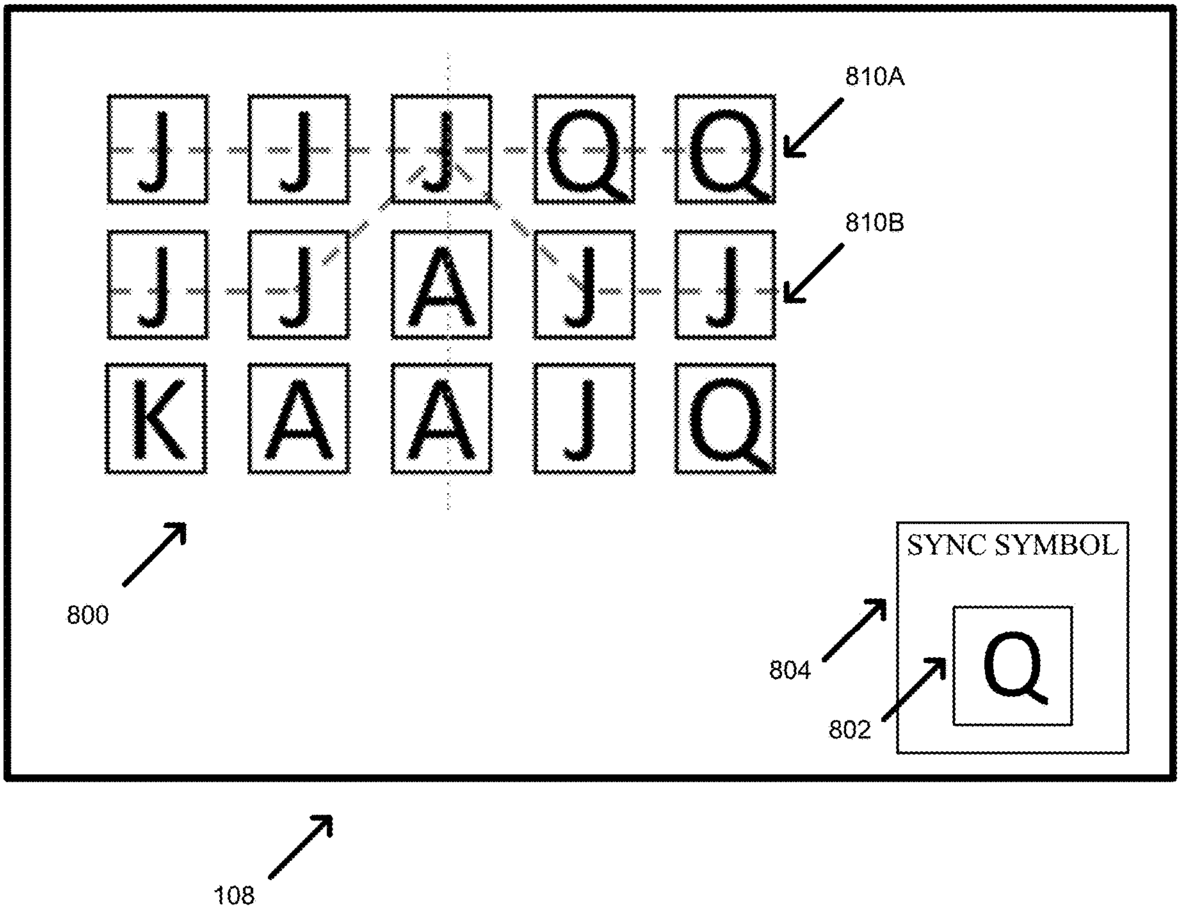

FIG. 8F depicts a graphical user interface on display component 108 after the vacant symbol positions shown in FIG. 8E are filled (e.g., by the sync symbol, J). The dashed lines 810A and 810B are some of the lines used to ascertain whether pre-determined patterns of symbols are present. In this case, set of symbols 800 includes two pre-determined pattern of symbols, JJJ along line 810A and JJJJJ along line 810B. Anew sync symbol 802 (Q) is also shown.

Figure 8G:
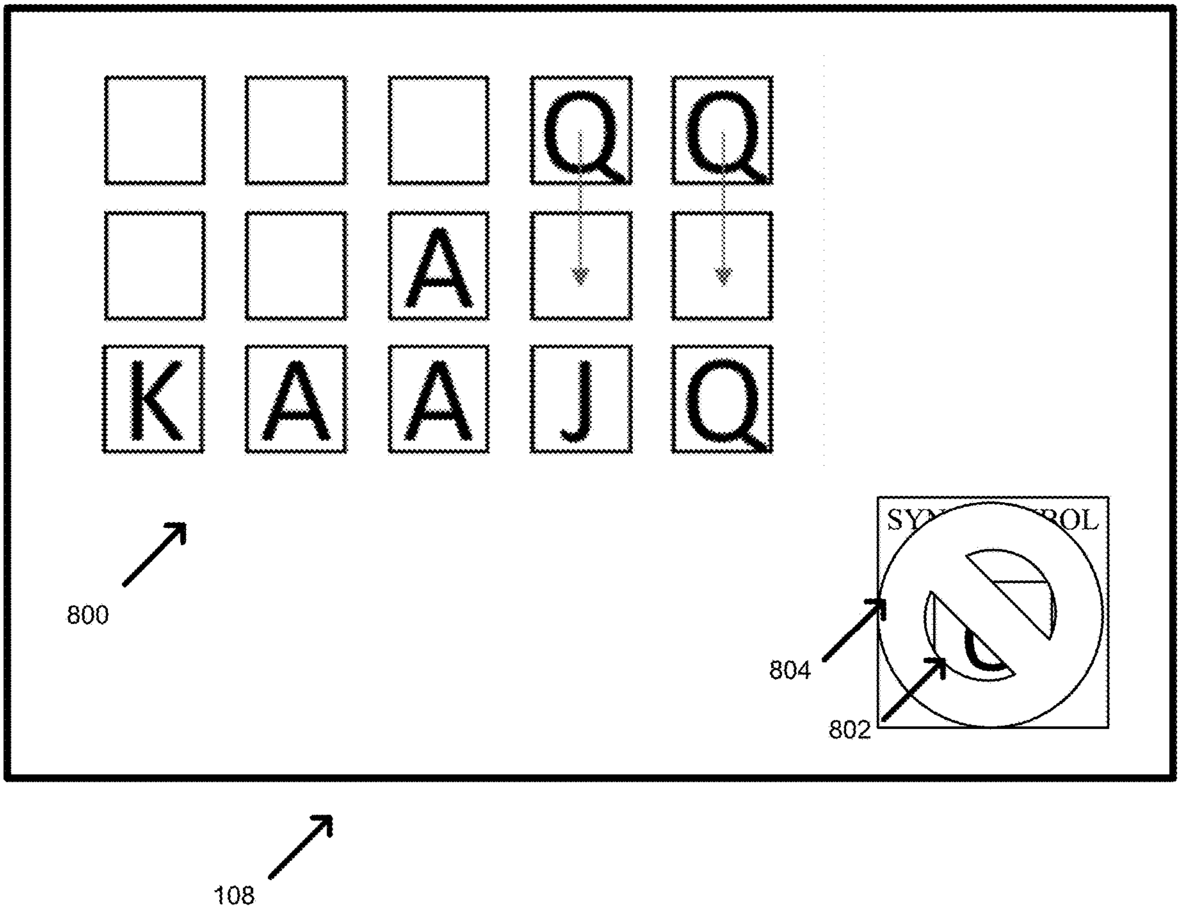
Figure 8H:
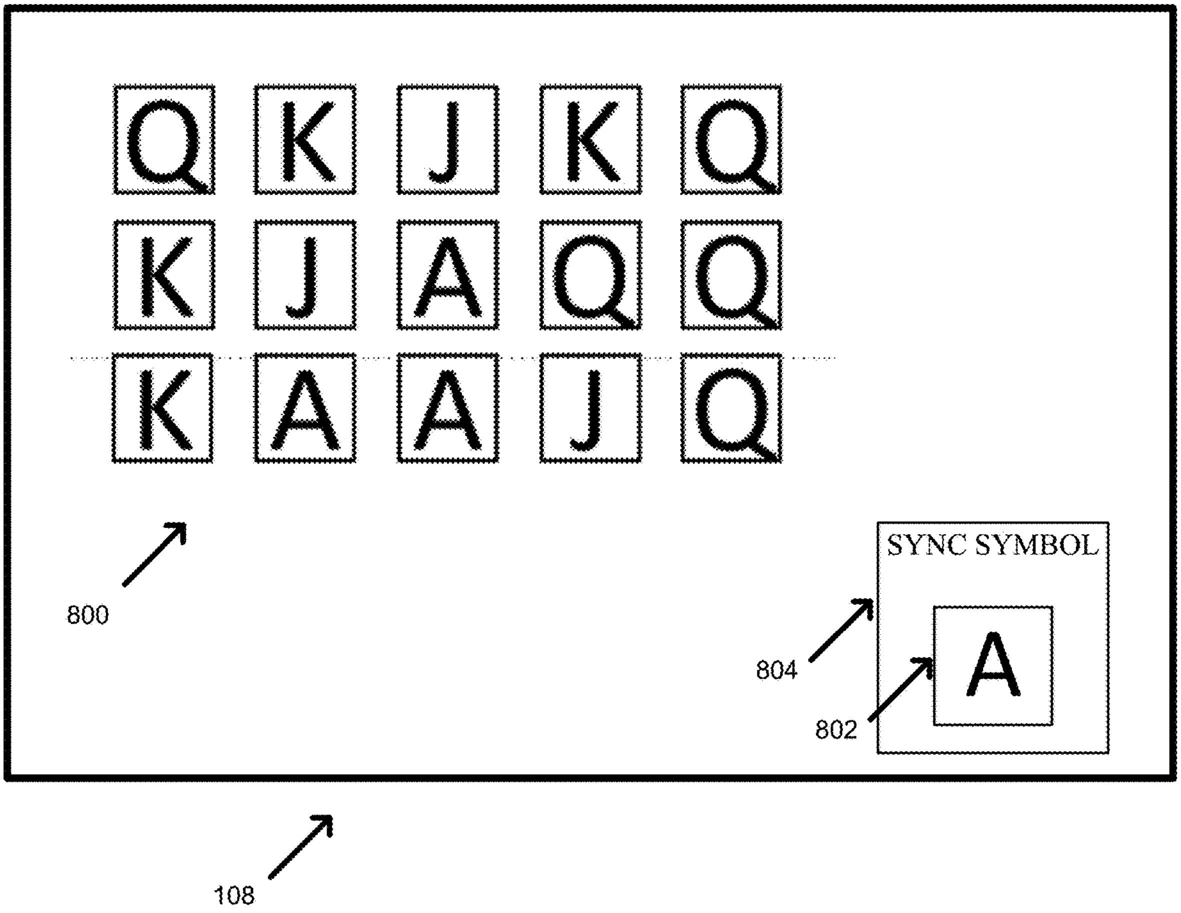

FIG. 8G depicts a graphical user interface on display component 108 after the pre-determined patterns shown in FIG. 8F are removed. Thus, the positions in which the symbols of these patterns were formerly located are shown as vacant. Further, it is assumed that the cascading feature is activated. Thus, any symbols above the vacant symbol locations drop down to fill these locations, as indicated by the down arrows. Additionally, FIG. 8G shows sync symbol 802 covered by an icon with a negative connotation, indicating that the replacement symbols used to fill the empty symbol positions will not be synchronized FIG. 8H depicts a graphical user interface on display component 108 after the vacant symbol positions shown in FIG. 8G are filled (e.g., by the next symbols in a segment of simulated strips or randomly chosen symbols). In this case, set of symbols 800 does not include any pre-determined patterns of symbols along any of the lines, so the spin ends. Regardless, a new sync symbol 802 (A) is also shown.

B. Late Determination and Display of the Sync Symbol

Figure 9:
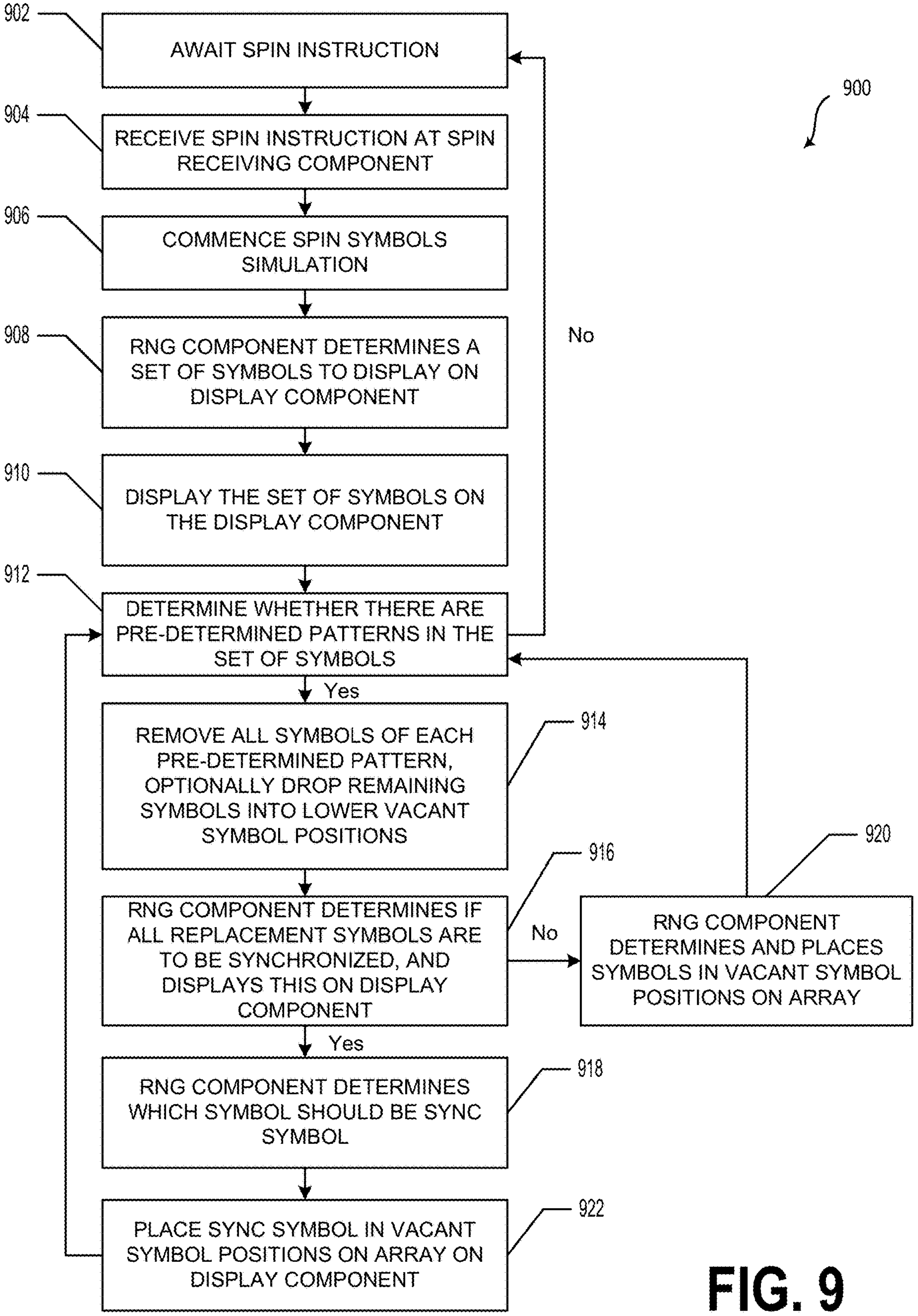
FIG. 9 is a flow chart, in accordance with example embodiments.

FIG. 9 illustrates a flow chart 900 involving late determination and display of a sync symbol that can be used as a synchronized replacement symbol. In some example embodiments, flow chart 900 may include fewer or more steps or blocks than those expressly illustrated or otherwise disclosed herein. Furthermore, respective steps or blocks of flow chart 900 may be performed in different order as compared to the order illustrated in FIG. 9.

Block 902 may involve electronic symbol display machine 102 awaiting a spin instruction. During this period, electronic symbol display machine 102 may display interstitial animations on display component 108, for example.

Block 904 may involve receiving a spin instruction at spin receiving component 110, e.g., from a user. As noted above, spin receiving component 110 may include an input modality of electronic symbol display machine 102, such a button, mouse, keyboard, or touchscreen.

Block 906 may involve commencing a spin symbols simulation in response to the spin instruction. This may include at least some steps of the transaction illustrated in FIG. 3, notably, electronic symbol display machine 102 requesting a result from remote device 202.

Block 908 may involve RNG component 214 of remote device 202 generating random numbers that ultimately are used to determine a set of symbols for electronic symbol display machine 102.

Block 910 may involve electronic symbol display machine 102 displaying the set of symbols on display component 108, e.g., in an array.

Block 912 may involve determining whether there are one or more pre-determined patterns in the set of symbols. If not, then control passes to block 902. If so, control passes to block 914.

Block 914 may involve removing symbols from each of the pre-determined patterns from the set of symbols as displayed, forming vacant symbol positions. If the cascading feature is activated, symbols above the vacant symbol positions may drop down to fill the vacant symbol position, thus forming other vacant symbol positions at or near the top of display component 108.

Block 916 may involve RNG component 214 of remote device 202 generating one or more random numbers that ultimately are used to determine whether all replacement symbols are to be synchronized. This may also include at least some steps of the transaction illustrated in FIG. 3, notably, electronic symbol display machine 102 requesting a result from remote device 202, remote device 202 generating one or more random numbers, using these random numbers to determine a result (whether the replacement symbols are synchronized), and providing this result to electronic symbol display machine 102.

If the replacement symbols are not to be synchronized, then block 920 may involve RNG component 214 generating random numbers that ultimately are used to determine replacement symbols. This may also include at least some steps of the transaction illustrated in FIG. 3, notably, electronic symbol display machine 102 requesting a result from remote device 202, remote device 202 generating one or more random numbers, using these random numbers to determine results (the replacement symbols), and providing these results to electronic symbol display machine 102. Electronic symbol display machine 102 may display these replacement symbols in the vacant symbol positions shown on display component 110.

If the replacement symbols are to be synchronized, then block 918 may involve RNG component 214 of remote device 202 generating random numbers that ultimately are used to generate a sync symbol. The sync symbol may be selected from a pool of possible sync symbols. In some cases, this pool may include all symbols displayable on electronic symbol display machine 102. In other cases, the pool of possible sync symbols may include symbols not otherwise displayed on electronic symbol display machine 102. This may include at least some steps of the transaction illustrated in FIG. 3, notably, remote device 202 generating one or more random numbers, using these random numbers to determine results, and providing these results to electronic symbol display machine 102.

Block 922 may involve electronic symbol display machine 102 placing the sync symbol in each of the vacant symbol positions shown on display component 110.

From blocks 920 and 922, control passes to block 912. Thus, the operations of blocks 912, 914, 916, 918, 920, and 922 may iterate zero or more further times based on whether one or more pre-determined patterns are matched after each symbol replacement.

FIGS. 10A through 10H provide steps of an example spin as displayed on electronic symbol display machine 102, in accordance with the procedure set forth by FIG. 9. The focus of these figures is on what information gets displayed—the methods used to generate the information displayed have been described above. The discussion of these figures is intended to be illustrative and not limiting. For demonstrative purposes and for this example spin, a pre-determined pattern of symbols includes scenarios where the same symbol appears in at least three adjacent columns, starting from the leftmost column.

Figure 10A:
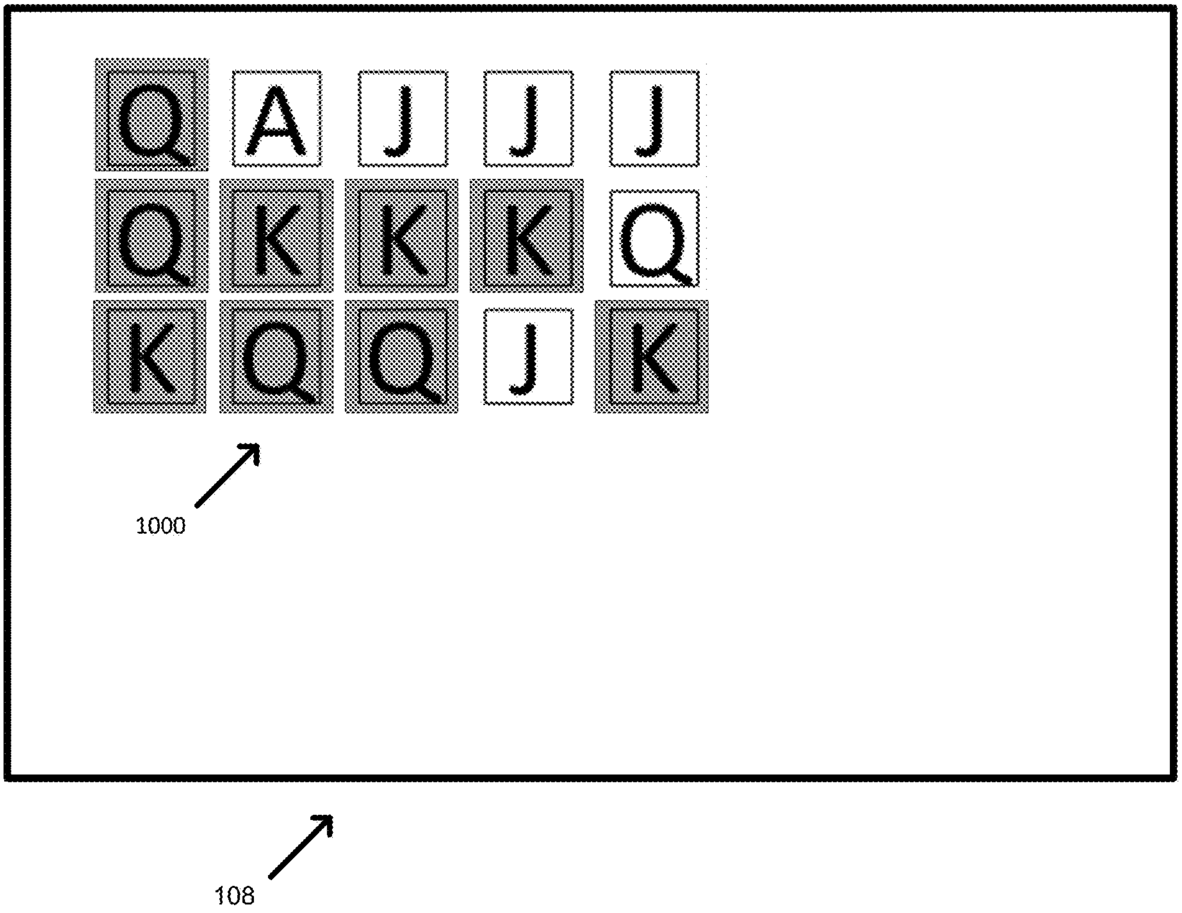
FIGS. 10A, 10B, 10C, 10D, 10E, 10F, 10G, and 10H depict a series of graphical user interfaces of an electronic symbol display machine, in accordance with example embodiments.

FIG. 10A depicts a graphical user interface on display component 108 after a simulated spin. A set of symbols 1000 are shown. The shaded areas are some of the areas used to ascertain whether pre-determined patterns of symbols are present. In this case, set of symbols 1000 includes two pre-determined patterns of symbols, QQQ along the leftmost three columns and KKKKK along all five columns.

Figure 10B:
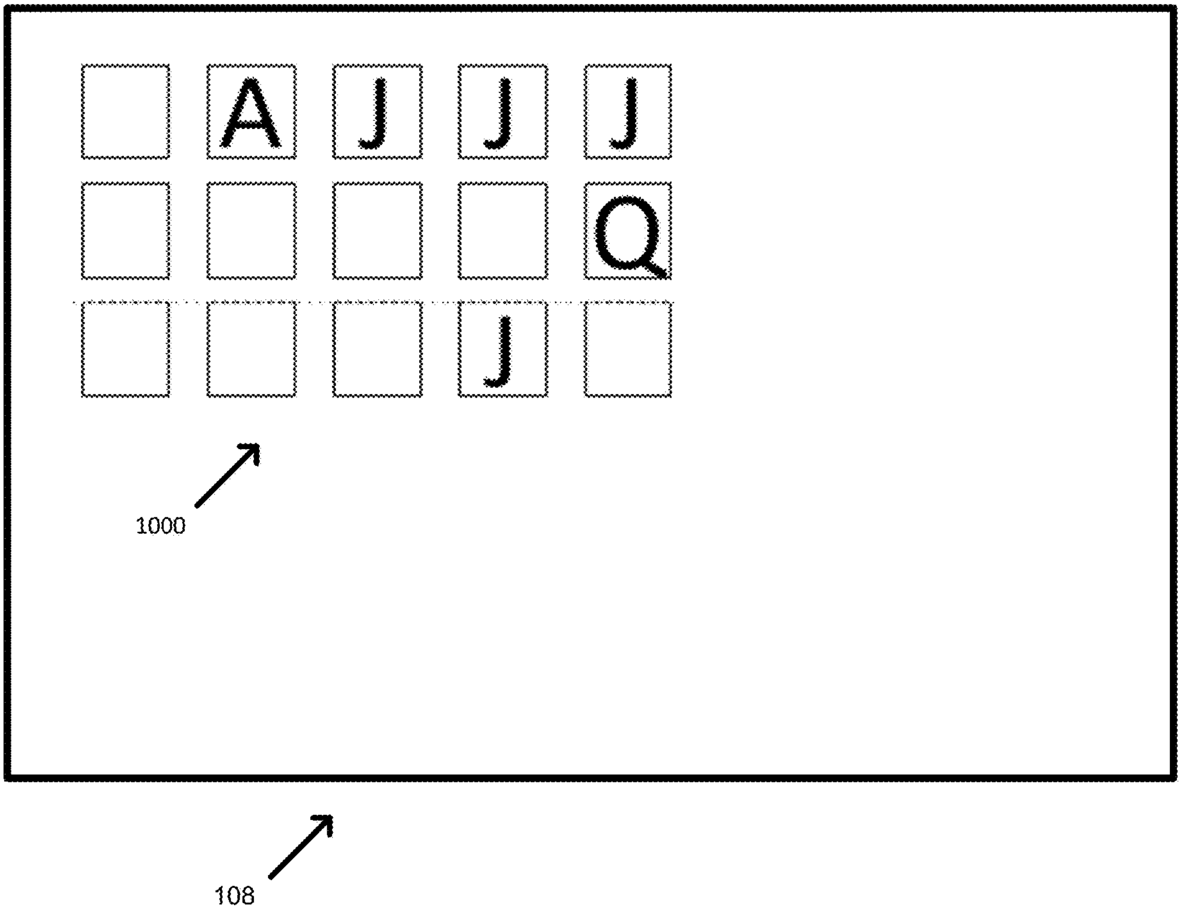

FIG. 10B depicts a graphical user interface on display component 108 after the pre-determined patterns shown in FIG. 10A are removed. Thus, the positions in which the symbols of these patterns were formerly located are shown as vacant. Further, it is assumed that the cascading feature is not activated. Thus, any symbols above the vacant symbol locations remain in their positions.

Figure 10C:
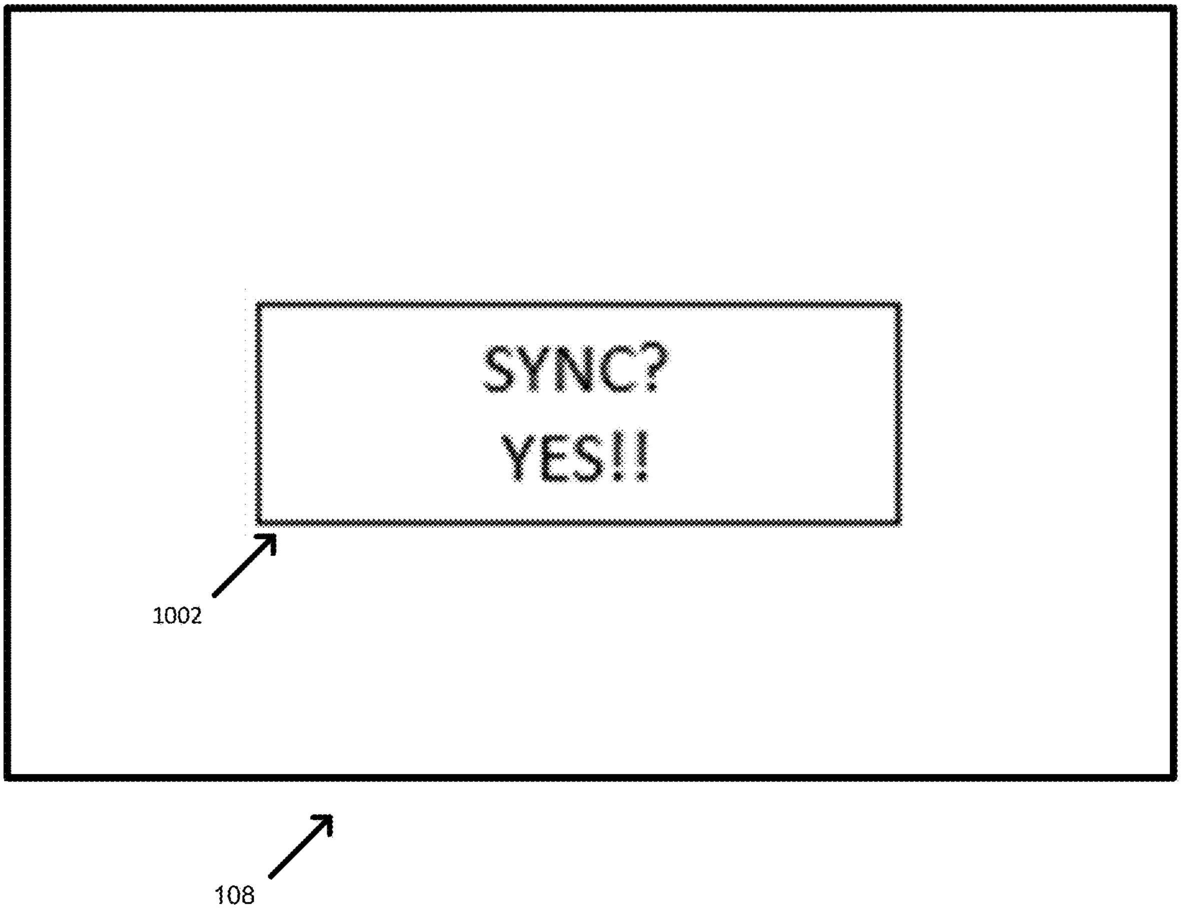

FIG. 10C depicts a graphical user interface on display component 108 displaying a message box 1002. Message box 1002 indicates that all replacement symbols are to be synchronized, and indicating that the sync symbol, once determined, will be used to fill all vacant symbol positions.

Figure 10D:
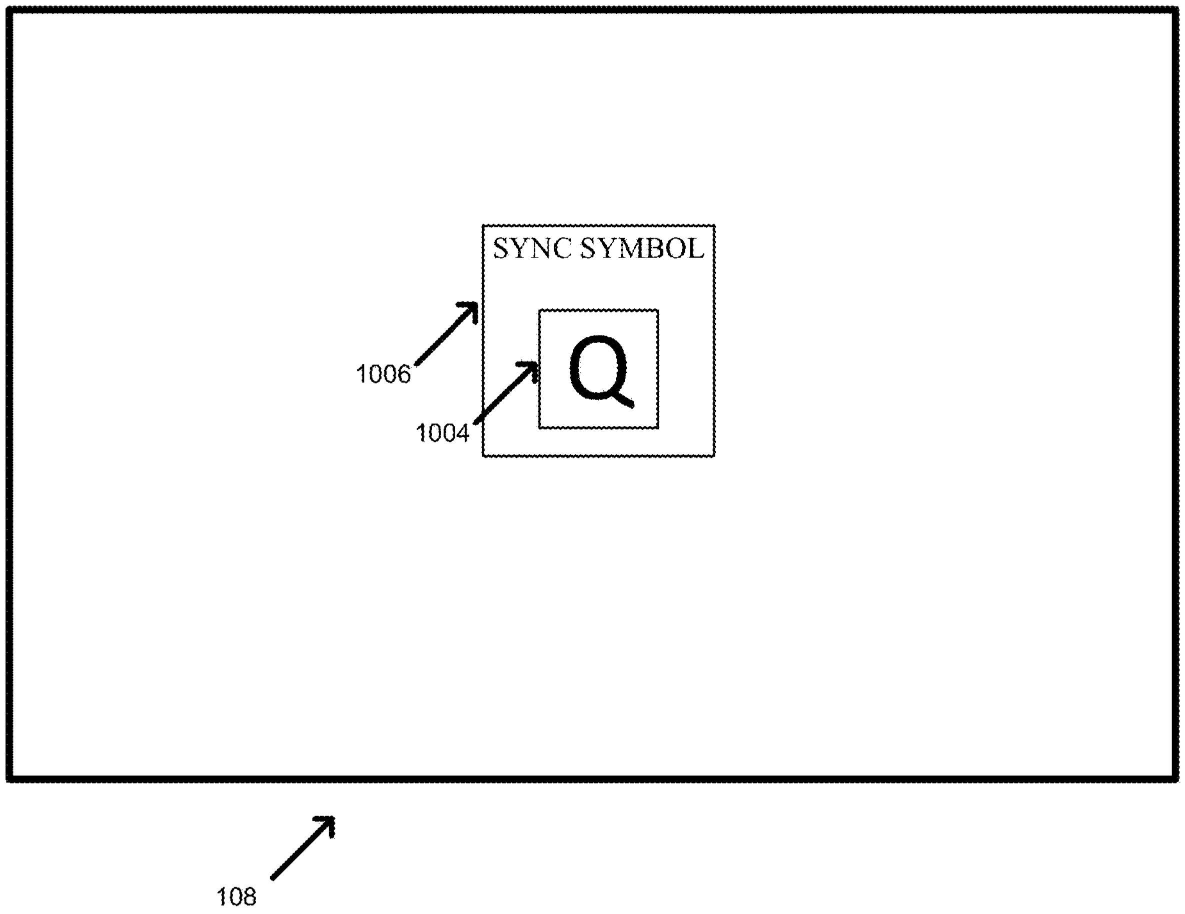

FIG. 10D depicts a graphical user interface on display component 108 where the determined sync symbol 1004 (Q) is shown. Sync symbol 1004 appears in a preview space 1006.

Figure 10E:
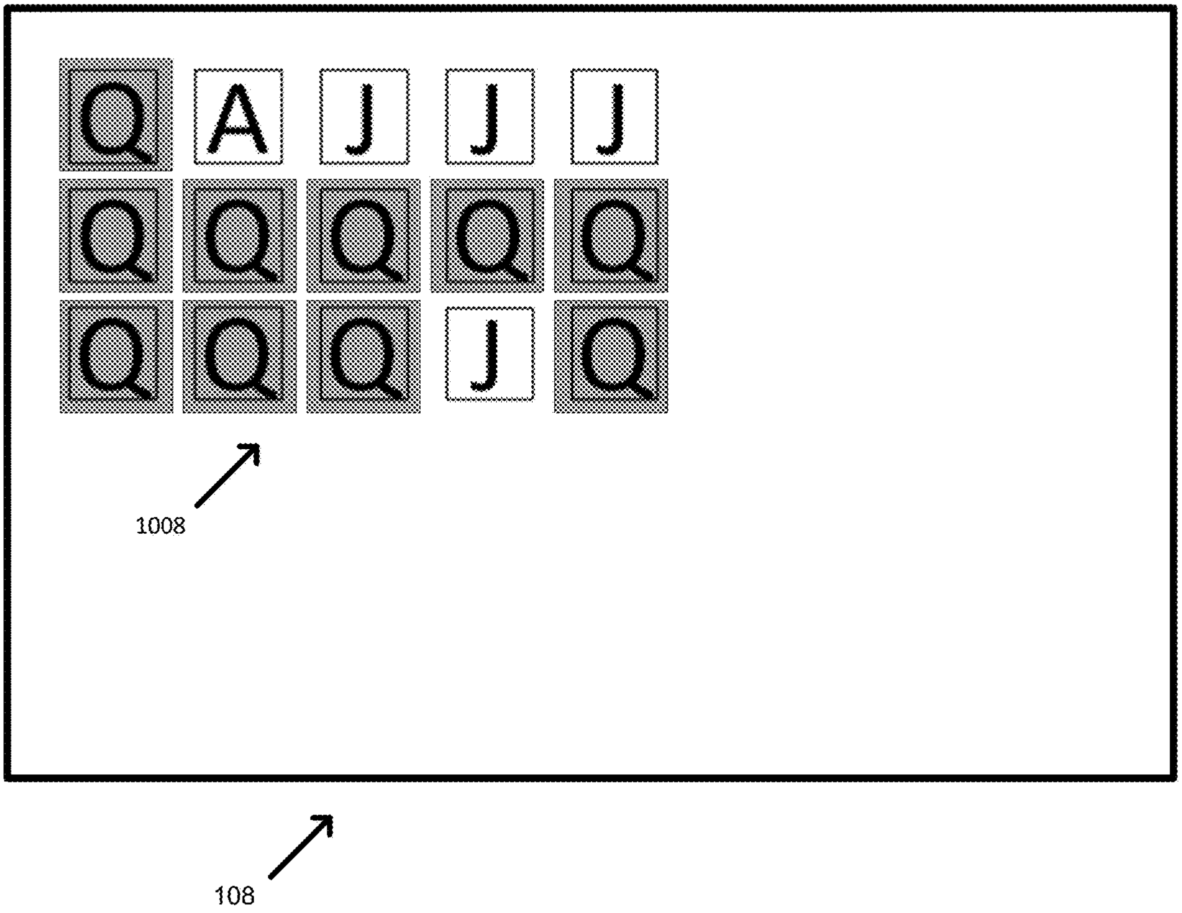

FIG. 10E depicts a graphical user interface on display component 108 after the vacant symbol positions shown in FIG. 10B are filled (e.g., by sync symbol, Q). The shadowed areas depict the formerly vacant symbol positions. In this case, set of symbols 1008 includes a pre-determined pattern of symbols, QQQQQ, along all five columns.

Figure 10F:
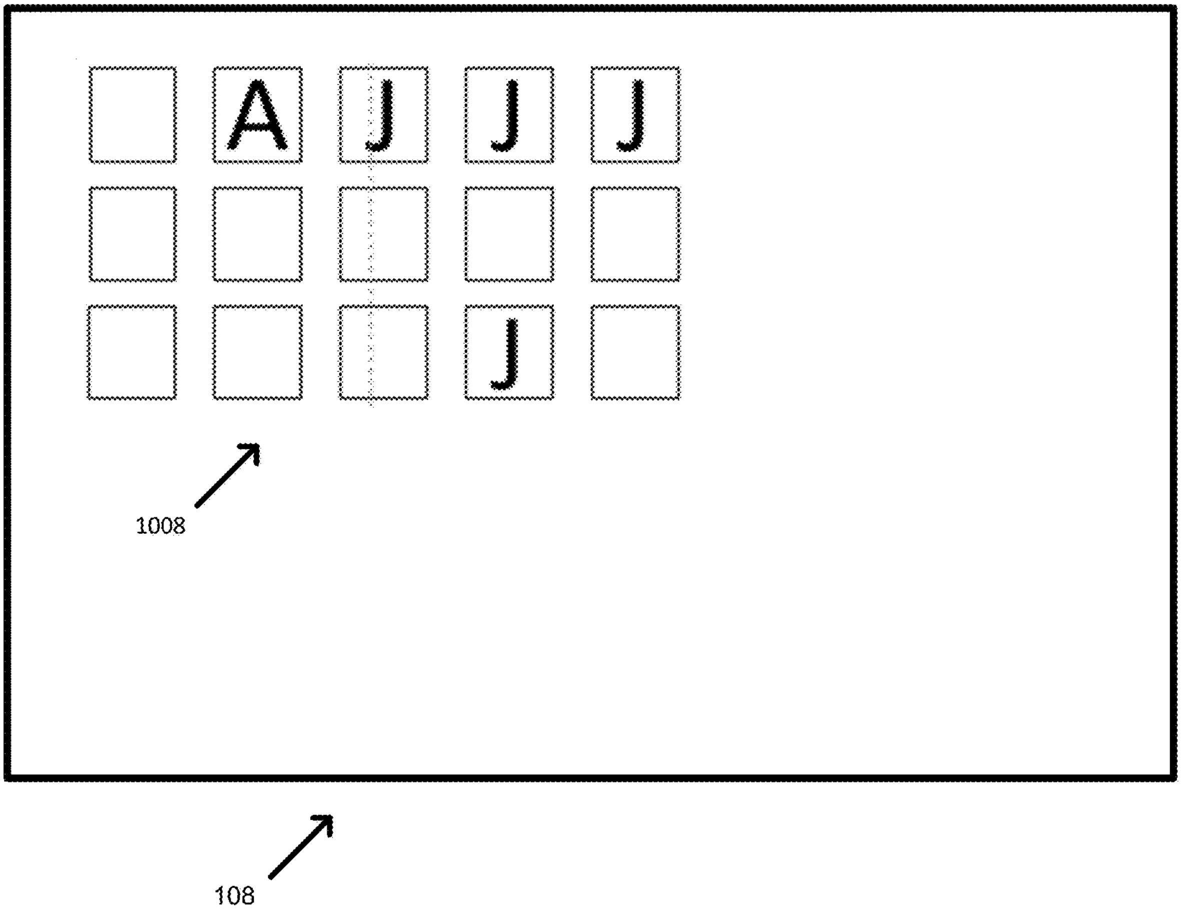

FIG. 10F depicts a graphical user interface on display component 108 after the pre-determined patterns shown in FIG. 10E are removed. Thus, the positions in which the symbols of these patterns were formerly located are shown as vacant. Further, it is assumed that the cascading feature is not activated. Thus, any symbols above the vacant symbol locations remain in the same position.

Figure 10G:
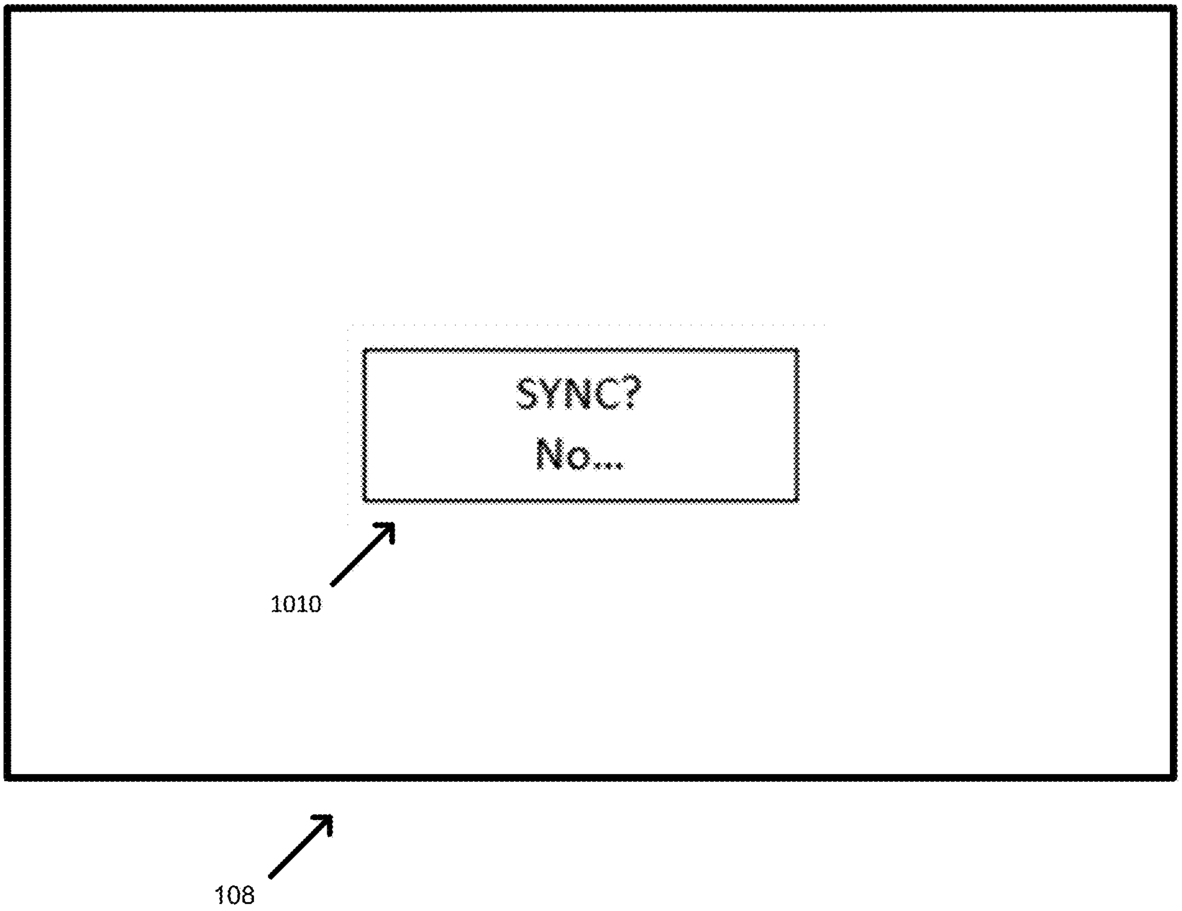

FIG. 10G depicts a graphical user interface on display component 108 displaying a message box 1010. Message box 1010 indicates that all replacement symbols are not to be synchronized, indicating that new replacement symbols will be used to fill all vacant symbol positions, (e.g., by the next symbols in a segment of simulated strips or randomly chosen symbols).

Figure 10H:
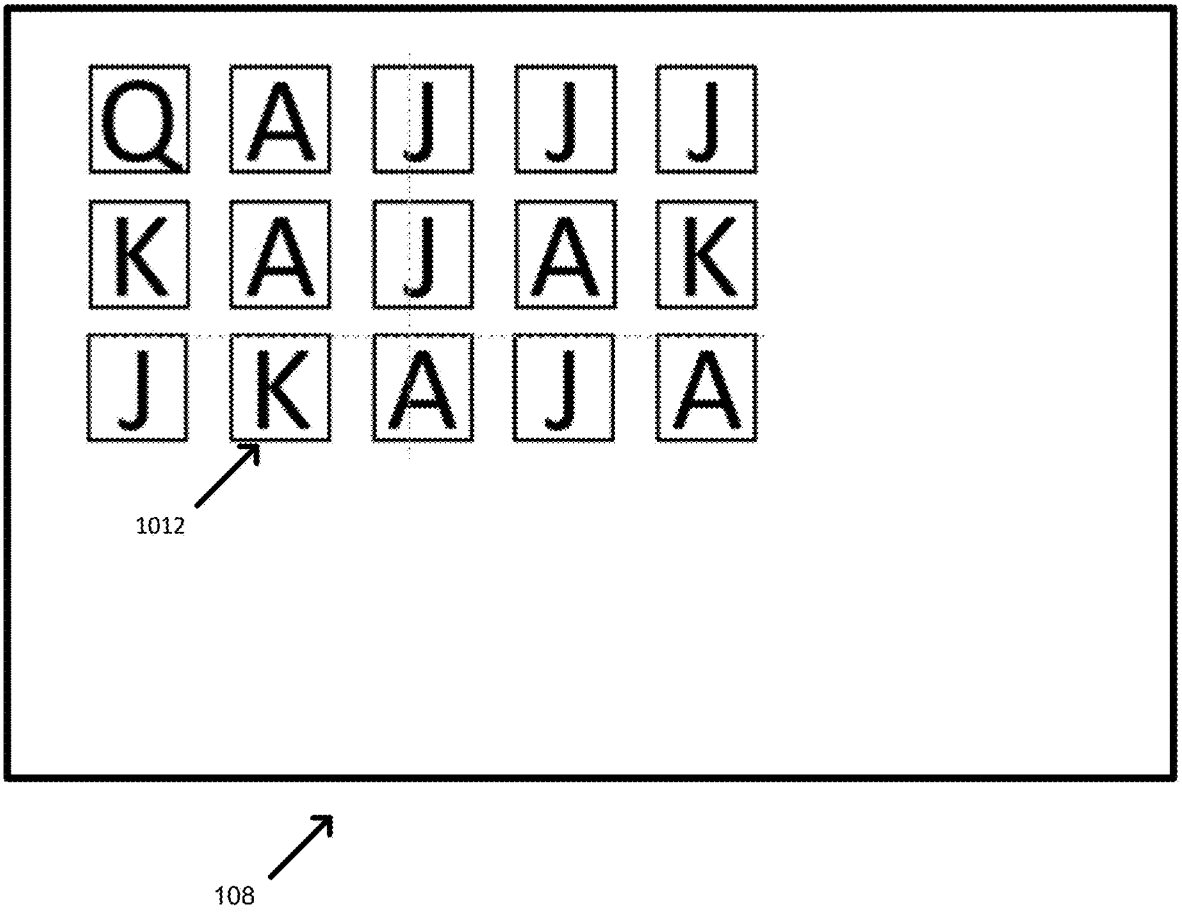

FIG. 10H depicts a graphical user interface on display component 108 after the vacant symbol positions shown in FIG. 10G are filled (e.g., by the next symbols in a segment of simulated strips or randomly chosen symbols). In this case, set of symbols 1012 does not include any pre-determined patterns of symbols will be used to fill all vacant symbol positions, so the spin ends.

Iv. Example Operations

Figure 11:
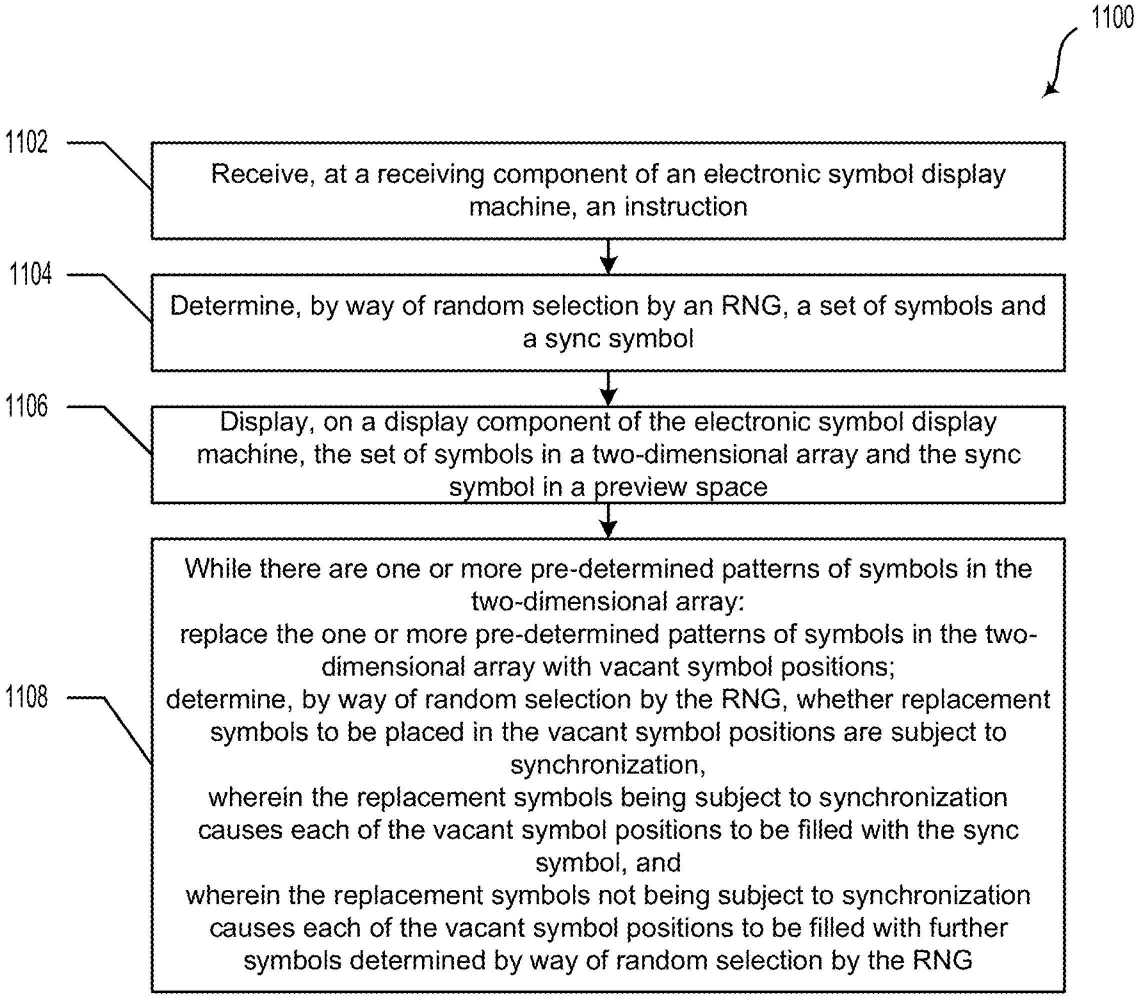
FIG. 11 is a flow chart, in accordance with example embodiments.
Figure 12:
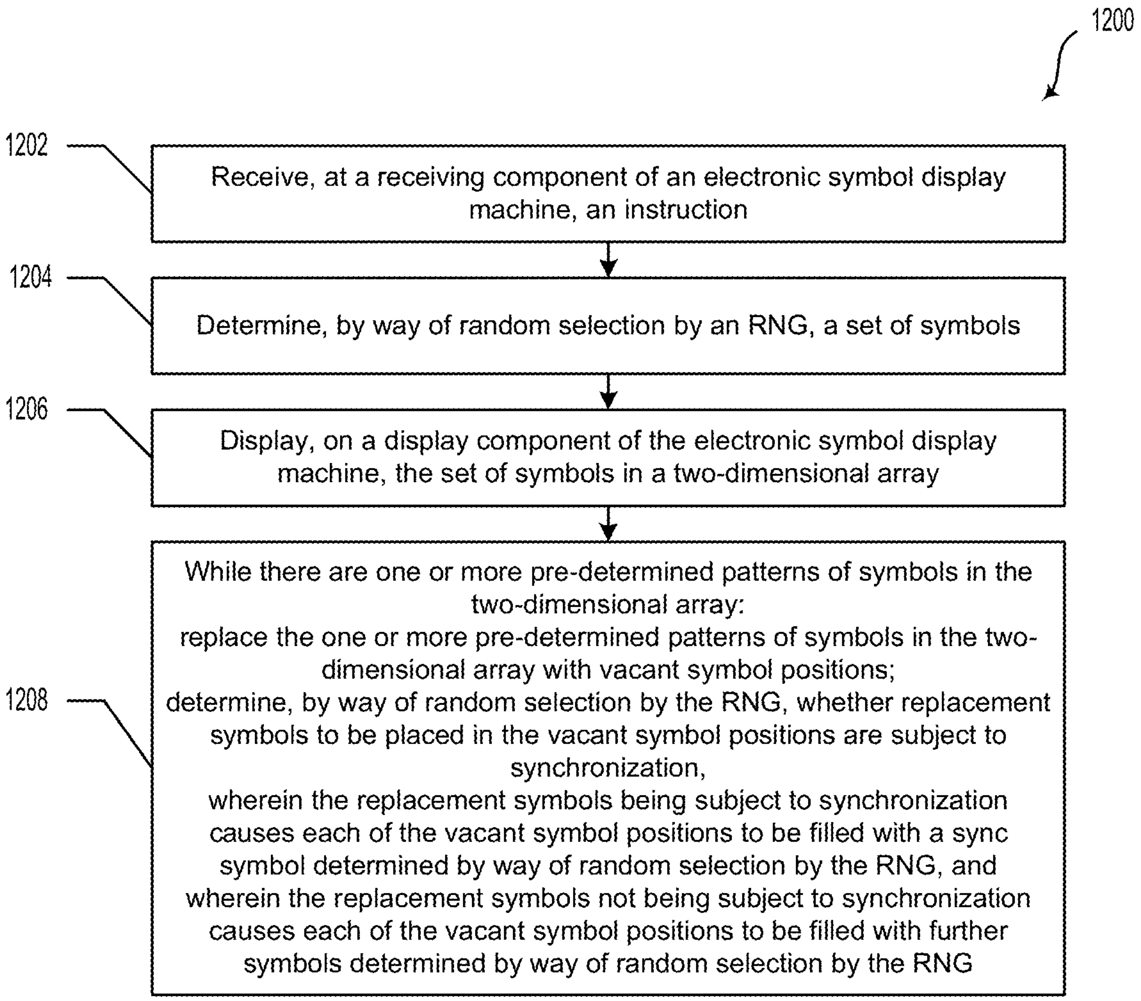
FIG. 12 is a flow chart, in accordance with example embodiments.

FIGS. 11 and 12 are flow charts depicting various embodiments that could be carried out on an electronic symbol display machine, perhaps in conjunction with a remote device. In some examples, these flow charts may include fewer or more steps or blocks than those expressly illustrated or otherwise disclosed herein. Furthermore, respective steps or blocks of these flow charts may be performed in different order as compared to the order illustrated in FIGS. 11 and 12, and may be combine with any other features described herein.

Block 1102 of flow chart 1100 may involve receiving, at a receiving component of an electronic symbol display machine, an instruction.

Block 1104 may involve determining, by way of random selection by an RNG, a set of symbols and a sync symbol.

Block 1106 may involve displaying, on a display component of the electronic symbol display machine, the set of symbols in a two-dimensional array and the sync symbol in a preview space.

Block 1108 may involve, while there are one or more pre-determined patterns of symbols in the two-dimensional array: replacing the one or more pre-determined patterns of symbols in the two-dimensional array with vacant symbol positions; determining, by way of random selection by the RNG, whether replacement symbols to be placed in the vacant symbol positions are subject to synchronization, wherein the replacement symbols being subject to synchronization causes each of the vacant symbol positions to be filled with the sync symbol, and wherein the replacement symbols not being subject to synchronization causes each of the vacant symbol positions to be filled with further symbols determined by way of random selection by the RNG.

In some embodiments, replacing the one or more pre-determined patterns of symbols in the two-dimensional array with the vacant symbol positions comprises: removing the one or more pre-determined patterns of symbols from the two-dimensional array; and moving remaining symbols in the two-dimensional array in a downward fashion so that all of the vacant symbol positions are stacked adjacent to a top of the two-dimensional array.

In some embodiments, each symbol of the set of symbols is drawn from a pool associated with a respective column of the two-dimensional array.

In some embodiments, columns of the two-dimensional array simulate circular strips of symbols, and displaying the set of symbols in the two-dimensional array comprises simulating a spin of at least one of the circular strips.

In some embodiments, the replacement symbols being subject to synchronization also causes the sync symbol in the preview space to be at least partially covered by an icon with a positive connotation.

In some embodiments, the replacement symbols not being subject to synchronization also causes the sync symbol in the preview space to be at least partially covered by an icon with a negative connotation.

In some embodiments, determining the set of symbols and the sync symbol comprises: transmitting a result request to a remote device, wherein the RNG is disposed within the remote device; and receiving a result specifying the set of symbols and the sync symbol from the remote device.

In some embodiments, the receiving component is a physical actuatable button that, when actuated, causes the instruction to be received by the electronic symbol display machine.

In some embodiments, the electronic symbol display machine comprises a physical actuatable dispensation button that, when actuated, causes an object of value to be dispensed by the electronic symbol display machine, and the object of value is based at least in part on instances of the one or more pre-determined patterns of symbols being in the set of symbols.

In some embodiments, the one or more pre-determined patterns of symbols comprise multiple instances of a particular symbol appearing in adjacent columns of the two-dimensional array.

Block 1202 of flow chart 1200 may involve receiving, at a receiving component of an electronic symbol display machine, an instruction.

Block 1204 may involve determining, by way of random selection by an RNG, a set of symbols.

Block 1206 may involve displaying, on a display component of the electronic symbol display machine, the set of symbols in a two-dimensional array; and Block 1208 may involve, while there are one or more pre-determined patterns of symbols in the two-dimensional array: replacing the one or more pre-determined patterns of symbols in the two-dimensional array with vacant symbol positions; determining, by way of random selection by the RNG, whether replacement symbols to be placed in the vacant symbol positions are subject to synchronization, wherein the replacement symbols being subject to synchronization causes each of the vacant symbol positions to be filled with a sync symbol determined by way of random selection by the RNG, and wherein the replacement symbols not being subject to synchronization causes each of the vacant symbol positions to be filled with further symbols determined by way of random selection by the RNG.

In some embodiments, replacing the one or more pre-determined patterns of symbols in the two-dimensional array with the vacant symbol positions comprises: removing the one or more pre-determined patterns of symbols from the two-dimensional array; and moving remaining symbols in the two-dimensional array in a downward fashion so that all of the vacant symbol positions are stacked adjacent to a top of the two-dimensional array.

In some embodiments, each symbol of the set of symbols is drawn from a pool associated with a respective column of the two-dimensional array.

In some embodiments, columns of the two-dimensional array simulate circular strips of symbols, and displaying the set of symbols in the two-dimensional array comprises simulating a spin of at least one of the circular strips.

In some embodiments, the replacement symbols being subject to synchronization also causes display, on the display component of the electronic symbol display machine, of an indication that the replacement symbols are subject to synchronization.

In some embodiments, the replacement symbols not being subject to synchronization also causes display, on the display component of the electronic symbol display machine, of an indication that the replacement symbols are not subject to synchronization.

In some embodiments, determining the set of symbols comprises: transmitting a result request to a remote device, wherein the RNG is disposed within the remote device; and receiving a result specifying the set of symbols from the remote device.

In some embodiments, the receiving component is a physical actuatable button that, when actuated, causes the instruction to be received by the electronic symbol display machine.

In some embodiments, the electronic symbol display machine comprises a physical actuatable dispensation button that, when actuated, causes an object of value to be dispensed by the electronic symbol display machine, and the object of value is based at least in part on instances of the one or more pre-determined patterns of symbols being in the set of symbols.

In some embodiments, the one or more pre-determined patterns of symbols comprise multiple instances of a particular symbol appearing in adjacent columns of the two-dimensional array.

V. Closing

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid-state drive, or another storage medium.

The computer readable medium can also include non-transitory computer readable media such as non-transitory computer readable media that store data for short periods of time like register memory and processor cache. The non-transitory computer readable media can further include non-transitory computer readable media that store program code and/or data for longer periods of time. Thus, the non-transitory computer readable media may include secondary or persistent long-term storage, like ROM, optical or magnetic disks, solid-state drives, or compact disc read only memory (CD-ROM), for example. The non-transitory computer readable media can also be any other volatile or non-volatile storage systems. A non-transitory computer readable medium can be considered a computer readable storage medium, for example, or a tangible storage device. Additionally or alternatively, the computer readable medium can include transient media such as carrier signals and transmission media.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments could include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

Implementations of the present disclosure may thus relate to one of the enumerated example embodiments (EEEs) listed below EEE1 may involve receiving, at a receiving component of an electronic symbol display machine, an instruction; determining, by way of random selection by an RNG, a set of symbols and a sync symbol; displaying, on a display component of the electronic symbol display machine, the set of symbols in a two-dimensional array and the sync symbol in a preview space; while there are one or more pre-determined patterns of symbols in the two-dimensional array: replacing the one or more pre-determined patterns of symbols in the two-dimensional array with vacant symbol positions; determining, by way of random selection by the RNG, whether replacement symbols to be placed in the vacant symbol positions are subject to synchronization, wherein the replacement symbols being subject to synchronization causes each of the vacant symbol positions to be filled with the sync symbol, and wherein the replacement symbols not being subject to synchronization causes each of the vacant symbol positions to be filled with further symbols determined by way of random selection by the RNG.

EEE2 may involve the embodiments of any previous EEEs, wherein replacing the one or more pre-determined patterns of symbols in the two-dimensional array with the vacant symbol positions comprises: removing the one or more pre-determined patterns of symbols from the two-dimensional array; and moving remaining symbols in the two-dimensional array in a downward fashion so that all of the vacant symbol positions are stacked adjacent to a top of the two-dimensional array.

EEE3 may involve the embodiments of any previous EEEs, wherein each symbol of the set of symbols is drawn from a pool associated with a respective column of the two-dimensional array.

EEE4 may involve the embodiments of any previous EEEs, wherein columns of the two-dimensional array simulate circular strips of symbols, and displaying the set of symbols in the two-dimensional array comprises simulating a spin of at least one of the circular strips.

EEE5 may involve the embodiments of any previous EEEs, wherein the replacement symbols being subject to synchronization also causes the sync symbol in the preview space to be at least partially covered by an icon with a positive connotation.

EEE6 may involve the embodiments of any previous EEEs, wherein the replacement symbols not being subject to synchronization also causes the sync symbol in the preview space to be at least partially covered by an icon with a negative connotation.

EEE7 may involve the embodiments of any previous EEEs, wherein determining the set of symbols and the sync symbol comprises: transmitting a result request to a remote device, wherein the RNG is disposed within the remote device; and receiving a result specifying the set of symbols and the sync symbol from the remote device.

EEE8 may involve the embodiments of any previous EEEs, wherein the receiving component is a physical actuatable button that, when actuated, causes the instruction to be received by the electronic symbol display machine.

EEE9 may involve the embodiments of any previous EEEs, wherein the electronic symbol display machine comprises a physical actuatable dispensation button that, when actuated, causes an object of value to be dispensed by the electronic symbol display machine, and the object of value is based at least in part on instances of the one or more pre-determined patterns of symbols being in the set of symbols.

EEE10 may involve the embodiments of any previous EEEs, wherein the one or more pre-determined patterns of symbols comprise multiple instances of a particular symbol appearing in adjacent columns of the two-dimensional array.

EEE11 may be standalone or involve the embodiments of any previous EEEs and may involve involve receiving, at a receiving component of an electronic symbol display machine, an instruction; determining, by way of random selection by an RNG, a set of symbols; displaying, on a display component of the electronic symbol display machine, the set of symbols in a two-dimensional array; and while there are one or more pre-determined patterns of symbols in the two-dimensional array: replacing the one or more pre-determined patterns of symbols in the two-dimensional array with vacant symbol positions; determining, by way of random selection by the RNG, whether replacement symbols to be placed in the vacant symbol positions are subject to synchronization, wherein the replacement symbols being subject to synchronization causes each of the vacant symbol positions to be filled with a sync symbol determined by way of random selection by the RNG, and wherein the replacement symbols not being subject to synchronization causes each of the vacant symbol positions to be filled with further symbols determined by way of random selection by the RNG.

EEE12 may involve the embodiments of any previous EEEs, wherein replacing the one or more pre-determined patterns of symbols in the two-dimensional array with the vacant symbol positions comprises: removing the one or more pre-determined patterns of symbols from the two-dimensional array; and moving remaining symbols in the two-dimensional array in a downward fashion so that all of the vacant symbol positions are stacked adjacent to a top of the two-dimensional array.

EEE13 may involve the embodiments of any previous EEEs, wherein each symbol of the set of symbols is drawn from a pool associated with a respective column of the two-dimensional array.

EEE14 may involve the embodiments of any previous EEEs, wherein columns of the two-dimensional array simulate circular strips of symbols, and displaying the set of symbols in the two-dimensional array comprises simulating a spin of at least one of the circular strips.

EEE15 may involve the embodiments of any previous EEEs, wherein the replacement symbols being subject to synchronization also causes display, on the display component of the electronic symbol display machine, of an indication that the replacement symbols are subject to synchronization.

EEE16 may involve the embodiments of any previous EEEs, wherein the replacement symbols not being subject to synchronization also causes display, on the display component of the electronic symbol display machine, of an indication that the replacement symbols are not subject to synchronization.

EEE17 may involve the embodiments of any previous EEEs, wherein determining the set of symbols comprises: transmitting a result request to a remote device, wherein the RNG is disposed within the remote device; and receiving a result specifying the set of symbols from the remote device.

EEE18 may involve the embodiments of any previous EEEs, wherein the receiving component is a physical actuatable button that, when actuated, causes the instruction to be received by the electronic symbol display machine.

EEE19 may involve the embodiments of any previous EEEs, wherein the electronic symbol display machine comprises a physical actuatable dispensation button that, when actuated, causes an object of value to be dispensed by the electronic symbol display machine, and the object of value is based at least in part on instances of the one or more pre-determined patterns of symbols being in the set of symbols.

EEE20 may involve the embodiments of any previous EEEs, wherein the one or more pre-determined patterns of symbols comprise multiple instances of a particular symbol appearing in adjacent columns of the two-dimensional array.

What is claimed is:

1. A computer-implemented method comprising:

receiving, at a receiving component of an electronic symbol display machine, an instruction;

determining, by way of random selection by a random number generator (RNG), a set of symbols and a sync symbol, wherein each symbol of the set of symbols is drawn from a pool of symbols, wherein the sync symbol is drawn from the pool of symbols;

displaying, on a display component of the electronic symbol display machine, the set of symbols in a two-dimensional array and the sync symbol in a preview space; and while there are one or more pre-determined patterns of symbols in the two-dimensional array:

replacing the one or more pre-determined patterns of symbols in the two-dimensional array with vacant symbol positions;

determining, by way of random selection by the RNG, whether replacement symbols to be placed in the vacant symbol positions are subject to synchronization, wherein the replacement symbols being subject to synchronization causes each of the vacant symbol positions to be filled with the sync symbol, and wherein the replacement symbols not being subject to synchronization causes each of the vacant symbol positions to be filled with further symbols determined by way of random selection by the RNG;

displaying, when the replacement symbols are subject to synchronization, a first icon at least partially covering the sync symbol in the preview space; and displaying, when the replacement symbols are not subject to synchronization, a second icon at least partially covering the sync symbol in the preview space, wherein the first icon and the second icon are different.

2. The computer-implemented method of claim 1, wherein replacing the one or more pre-determined patterns of symbols in the two-dimensional array with the vacant symbol positions comprises:

removing the one or more pre-determined patterns of symbols from the two-dimensional array; and moving remaining symbols in the two-dimensional array in a downward fashion so that all of the vacant symbol positions are stacked adjacent to a top of the two-dimensional array.

3. The computer-implemented method of claim 1, wherein each symbol of the set of symbols is associated with a respective column of the two-dimensional array.

4. The computer-implemented method of claim 1, wherein columns of the two-dimensional array simulate circular strips of symbols, and wherein displaying the set of symbols in the two-dimensional array comprises simulating a spin of at least one of the circular strips.

5. The computer-implemented method of claim 1, wherein determining the set of symbols and the sync symbol comprises:

transmitting a result request to a remote device, wherein the RNG is disposed within the remote device; and receiving a result specifying the set of symbols and the sync symbol from the remote device.

6. The computer-implemented method of claim 1, wherein the receiving component is a physical actuatable button that, when actuated, causes the instruction to be received by the electronic symbol display machine.

7. The computer-implemented method of claim 1, wherein the electronic symbol display machine comprises a physical actuatable dispensation button that, when actuated, causes an object of value to be dispensed by the electronic symbol display machine, and wherein the object of value is based at least in part on instances of the one or more pre-determined patterns of symbols being in the set of symbols.

8. The computer-implemented method of claim 1, wherein the one or more pre-determined patterns of symbols comprise multiple instances of a particular symbol appearing in adjacent columns of the two-dimensional array.

9. A non-transitory computer-readable medium comprising computer-implementable instructions configured to cause an electronic symbol display machine to carry out operations comprising:

receiving, at a receiving component of the electronic symbol display machine, an instruction;

determining, by way of random selection by a random number generator (RNG), a set of symbols and a sync symbol, wherein each symbol of the set of symbols is drawn from a pool of symbols, wherein the sync symbol is drawn from the pool of symbols;

displaying, on a display component of the electronic symbol display machine, the set of symbols in a two-dimensional array and the sync symbol in a preview space; and while there are one or more pre-determined patterns of symbols in the two-dimensional array:

replacing the one or more pre-determined patterns of symbols in the two-dimensional array with vacant symbol positions;

determining, by way of random selection by the RNG, whether replacement symbols to be placed in the vacant symbol positions are subject to synchronization, wherein the replacement symbols being subject to synchronization causes each of the vacant symbol positions to be filled with the sync symbol, and wherein the replacement symbols not being subject to synchronization causes each of the vacant symbol positions to be filled with further symbols determined by way of random selection by the RNG;

displaying, when the replacement symbols are subject to synchronization, a first icon at least partially covering the sync symbol in the preview space; and displaying, when the replacement symbols are not subject to synchronization, a second icon at least partially covering the sync symbol in the preview space, wherein the first icon and the second icon are different.

10. A computer-implemented method comprising:

receiving, at a receiving component of an electronic symbol display machine, an instruction;

determining, by way of random selection by a random number generator (RNG), a set of symbols, wherein each symbol of the set of symbols is drawn from a pool of symbols;

displaying, on a display component of the electronic symbol display machine, the set of symbols in a two-dimensional array; and while there are one or more pre-determined patterns of symbols in the two-dimensional array:

replacing the one or more pre-determined patterns of symbols in the two-dimensional array with vacant symbol positions;

determining, by way of random selection by the RNG, whether replacement symbols to be placed in the vacant symbol positions are subject to synchronization, wherein the replacement symbols being subject to synchronization causes each of the vacant symbol positions to be filled with a sync symbol determined by way of random selection by the RNG, wherein the sync symbol is drawn from the pool of symbols, and wherein the replacement symbols not being subject to synchronization causes each of the vacant symbol positions to be filled with further symbols determined by way of random selection by the RNG;

displaying the sync symbol in a preview space on the display component of the electronic symbol display machine;

displaying, when the replacement symbols are subject to synchronization, a first icon at least partially covering the sync symbol in the preview space; and displaying, when the replacement symbols are not subject to synchronization, a second icon at least partially covering the sync symbol in the preview space, wherein the first icon and the second icon are different.

11. The computer-implemented method of claim 10, wherein replacing the one or more pre-determined patterns of symbols in the two-dimensional array with the vacant symbol positions comprises:

removing the one or more pre-determined patterns of symbols from the two-dimensional array; and moving remaining symbols in the two-dimensional array in a downward fashion so that all of the vacant symbol positions are stacked adjacent to a top of the two-dimensional array.

12. The computer-implemented method of claim 10, wherein each symbol of the set of symbols is associated with a respective column of the two-dimensional array.

13. The computer-implemented method of claim 10, wherein columns of the two-dimensional array simulate circular strips of symbols, and wherein displaying the set of symbols in the two-dimensional array comprises simulating a spin of at least one of the circular strips.

14. The computer-implemented method of claim 10, wherein determining the set of symbols comprises:

transmitting a result request to a remote device, wherein the RNG is disposed within the remote device; and receiving a result specifying the set of symbols from the remote device.

15. The computer-implemented method of claim 10, wherein the receiving component is a physical actuatable button that, when actuated, causes the instruction to be received by the electronic symbol display machine.

16. The computer-implemented method of claim 10, wherein the electronic symbol display machine comprises a physical actuatable dispensation button that, when actuated, causes an object of value to be dispensed by the electronic symbol display machine, and wherein the object of value is based at least in part on instances of the one or more pre-determined patterns of symbols being in the set of symbols.

* * * * *